(12) United States Patent
Hamel et al.

(10) Patent No.: US 8,913,138 B2
(45) Date of Patent: Dec. 16, 2014

(54) HANDHELD MAGNIFICATION DEVICE WITH A TWO-CAMERA MODULE

(71) Applicant: Technologies Humanware Inc., Longueuil (Quebec) (CA)

(72) Inventors: Pierre Hamel, Verdun (CA); Martin Julien, Brossard (CA); Francois Boutrouille, St-Lambert (CA); Stephane Sicard, Montreal (CA); Carle Auclair, La Prairie (CA)

(73) Assignee: Technologies Humanware Inc., Longueuil (Quebec) (CA)

( * ) Notice: Subject to any disclaimer, the term of this patent is extended or adjusted under 35 U.S.C. 154(b) by 202 days.

(21) Appl. No.: 13/724,964

(22) Filed: Dec. 21, 2012

(65) Prior Publication Data

US 2014/0176767 A1 Jun. 26, 2014

(51) Int. Cl.
 *H04N 5/225* (2006.01)
 *H04N 5/262* (2006.01)
 *H04N 5/232* (2006.01)

(52) U.S. Cl.
 CPC ......... *H04N 5/23296* (2013.01); *H04N 5/2252* (2013.01); *H04N 5/23293* (2013.01)
 USPC .................. 348/207.99; 348/240.99; 348/376

(58) Field of Classification Search
 None
 See application file for complete search history.

(56) References Cited

U.S. PATENT DOCUMENTS

| | | | |
|---|---|---|---|
| 5,831,667 A | 11/1998 | Siminou | |
| 6,033,224 A | 3/2000 | Kurzweil et al. | |
| 6,045,238 A | 4/2000 | Wheeler et al. | |
| D624,107 S | 9/2010 | Goldenberg | |
| 2003/0020814 A1* | 1/2003 | Ono | 348/220.1 |
| 2003/0147050 A1* | 8/2003 | Nakamura | 353/31 |
| 2005/0062847 A1 | 3/2005 | Johnston | |
| 2006/0187312 A1* | 8/2006 | Labaziewicz et al. | 348/218.1 |
| 2007/0292026 A1 | 12/2007 | Reznik et al. | |
| 2008/0231950 A1 | 9/2008 | Lvovsky et al. | |
| 2009/0048842 A1 | 2/2009 | Albrecht et al. | |
| 2009/0237660 A1 | 9/2009 | Albrecht et al. | |
| 2010/0277619 A1 | 11/2010 | Scarff | |
| 2010/0329555 A1 | 12/2010 | Chapman et al. | |
| 2010/0331043 A1 | 12/2010 | Chapman et al. | |
| 2011/0066424 A1 | 3/2011 | Albrecht et al. | |
| 2011/0141256 A1 | 6/2011 | Rodriguez et al. | |

(Continued)

FOREIGN PATENT DOCUMENTS

| | | |
|---|---|---|
| GB | 2428530 | 1/2007 |
| GB | 2471145 | 12/2010 |

(Continued)

*Primary Examiner* — Justin P Misleh
(74) *Attorney, Agent, or Firm* — Hovey Williams LLP

(57) ABSTRACT

A handheld magnification device for displaying a magnified representation of an object in a see-through manner is provided. The handheld magnification device includes a casing and a first and a second camera both adapted to acquire an image of the object, and having respectively a first working range proximate the handheld magnification device and a second working range different from and extending beyond the first working range. The handheld magnification device also includes a distance-sensitive sensor for measuring a distance parameter representative of a distance between the object and the handheld magnification device, as well as a processing unit for automatically selecting, based on the distance parameter and the first and second working ranges, one of the first and second cameras as a selected camera. The handheld magnification device further includes a display for displaying the magnified representation of the object based on the image acquired by the selected camera.

39 Claims, 12 Drawing Sheets

(56) References Cited

U.S. PATENT DOCUMENTS

| | | |
|---|---|---|
| 2011/0164061 A1 | 7/2011 | Weiss et al. |
| 2011/0182471 A1 | 7/2011 | Reznik et al. |
| 2012/0029920 A1 | 2/2012 | Albrecht et al. |
| 2013/0147910 A1* | 6/2013 | Xin .................................. 348/38 |

FOREIGN PATENT DOCUMENTS

| | | |
|---|---|---|
| KR | 20070089290 | 8/2007 |
| WO | 9924969 | 5/1999 |
| WO | 0007357 | 2/2000 |
| WO | 0036839 | 6/2000 |
| WO | 2005096760 | 10/2005 |
| WO | 2007095236 | 8/2007 |
| WO | 2007109337 | 9/2007 |
| WO | 2008063597 | 5/2008 |
| WO | 2008116140 | 9/2008 |
| WO | 2009006015 | 1/2009 |
| WO | 2009154451 | 12/2009 |
| WO | 2010017121 | 2/2010 |
| WO | 2010025359 | 3/2010 |
| WO | 2010033914 | 3/2010 |
| WO | 2011159898 | 12/2011 |

* cited by examiner

HANDHELD MAGNIFICATION DEVICE WITH A TWO-CAMERA MODULE

FIELD OF THE INVENTION

The present invention generally relates to devices for low-vision individuals and more particularly concerns a handheld magnification device including a two-camera module for displaying a magnified representation of an object in a see-through manner over a broad working range.

BACKGROUND

Loss of visual acuity is a growing concern worldwide. The World Health Organization currently estimates to 2.5% the incidence of low vision in industrialized countries and this figure is expected to continue increasing with ageing population. Low vision may be generally referred to as a condition where ordinary eye glasses, lens implants or contact lenses are not sufficient for providing sharp sight. The largest growing segment of the low-vision population in developed countries is expected to be people aged 65 years old and older, which most notably due to age-related eye diseases such as macular degeneration, glaucoma and diabetic retinopathy, cataract, detached retina, and retinitis pigmentosa. Some people are also born with low vision.

Low-vision individuals often find it difficult, if not impossible, to read small writing or to discern small objects without high levels of magnification. This limits their ability to lead an independent life because reading glasses and magnifying glass typically cannot provide sufficient magnification for them. In order to assist low-vision individuals in performing daily tasks, various magnification devices and systems are known in the art and may be broadly classified into one of two categories: desktop and portable video magnifiers.

On the one hand, desktop video magnifiers generally include a video monitor mounted on a stand having a gooseneck shape. A camera having a large optical zoom is installed on the stand over a working area on which a user disposes an object to be magnified, which is typically a document the user wishes to read. The camera feeds a video processor with a video signal of the working area, and the video processor in turn feeds this video signal with an increased sharpness and enhanced contrast to the video monitor. The document is typically disposed on an XY translation table assembled on rails, allowing the user to freely move the XY table and the document thereon to bring different portions of the document within the field of view of the camera.

On the other hand, portable or handheld video magnifiers are devices that are small enough to be easily carried by a user in a pocket or purse. Such devices may typically include a video camera on one side and a small built-in LCD display on the other side. Portable video magnifiers typically include a video processor providing sharpness enhancement, enhanced contrast modes and digital magnification. More particularly, while appropriate for use in many applications, currently available handheld magnification devices suffer from a number of limitations. One limitation is that known handheld magnification devices have a limited depth of field in that they are generally capable of magnifying close objects with acceptable video images sharpness, but are typically not adapted for providing high-quality video images over a broad and continuous range of working distances.

In view of the above considerations, there is therefore a need in the art for a handheld magnification device directed to low-vision individuals that alleviates at least some of the drawbacks of the prior art.

SUMMARY

In accordance with one aspect of the invention, there is provided a handheld magnification device for displaying a magnified representation of an object in a see-through manner. The handheld magnification device includes:
  a casing having a camera face for pointing toward the object and a display face opposite to the camera face;
  a first and a second camera both adapted to acquire an image of the object, each camera having a corresponding field of view extending from the camera face of the casing, the first camera having a first working range proximate the handheld magnification device and the second camera having a second working range different from and extending beyond the first working range;
  a distance-sensitive sensor for measuring in real-time a distance parameter representative of a distance between the object and the handheld magnification device;
  a processing unit for receiving the distance parameter from the distance-sensitive sensor and for automatically selecting, based on the distance parameter and the first and second working ranges, one of the first and second cameras as a selected camera; and
  a display extending along the display face of the casing for displaying, in real-time, the magnified representation of the object based on the image acquired by the selected camera.

Other features and advantages of the present invention will be better understood upon reading of preferred embodiments thereof with reference to the appended drawings.

BRIEF DESCRIPTION OF THE DRAWINGS

In FIG. 6A, the first and second working ranges are contiguous without overlapping. In FIG. 6B, the first and second working ranges are overlapping. In FIG. 6C, the first and second working ranges are separated from each other by an inter-range distance.

In FIG. 8A, the non-selected camera is inactive, while in FIG. 8B, the non-selected camera is active.

In FIG. 9A, the structured visible pattern circumscribes completely the image of the object to be acquired by the selected camera. In FIG. 9B, the structured visible pattern circumscribes partially the image of the object to be acquired by the selected camera.

DESCRIPTION OF PREFERRED EMBODIMENTS

Figure 1:
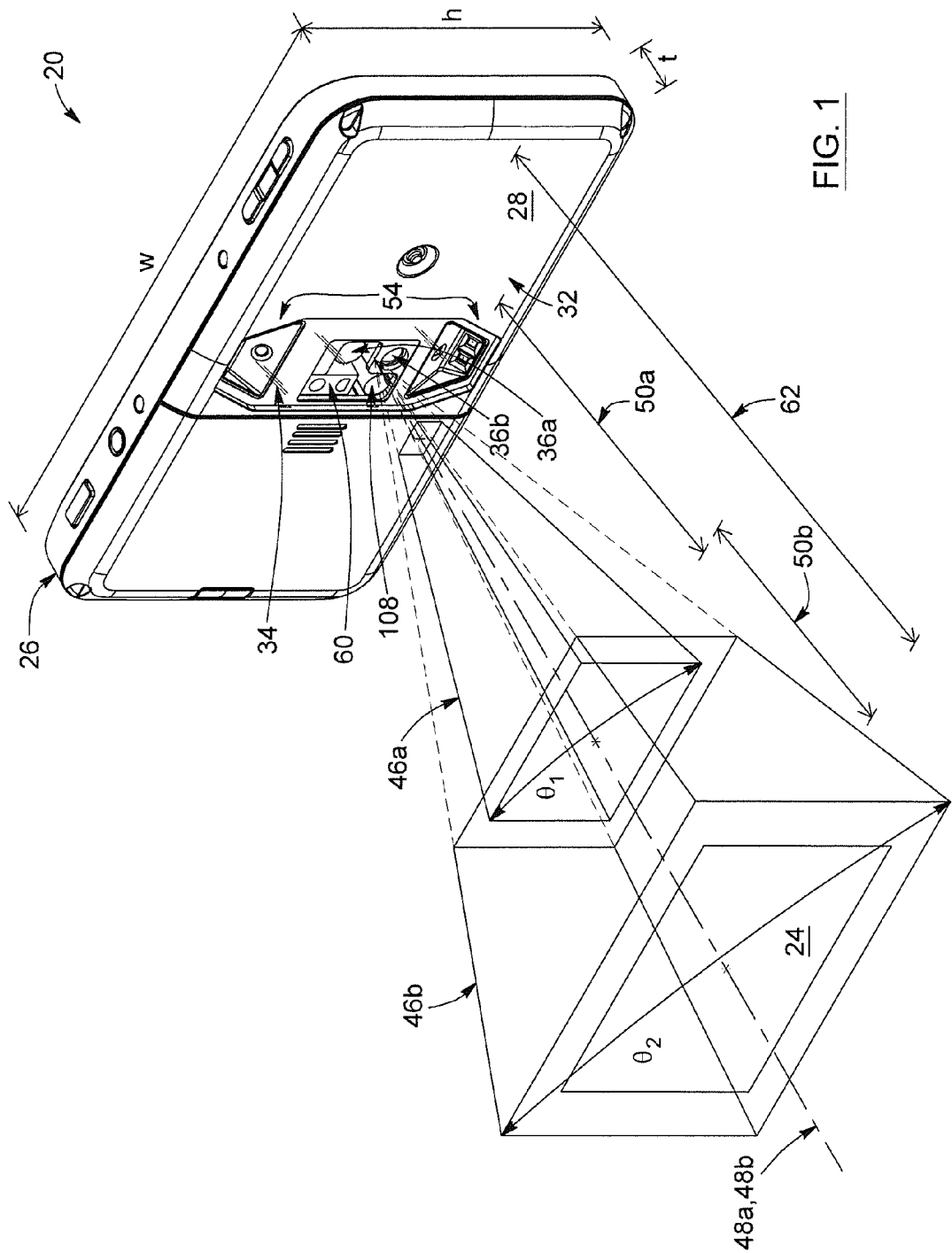
FIG. 1 is a perspective view of a handheld magnification device in accordance with an embodiment of the invention, wherein the camera face of the handheld magnification device is shown.

In accordance with one aspect of the invention, there is provided a handheld magnification device for displaying a magnified representation of an object in a see-through manner.

As will be described in further detail below, the handheld magnification device of the present invention generally includes a casing, a first and a second high-resolution camera, a distance-sensitive sensor, a processing unit and a display. The handheld magnification device allows magnifying an object located in a field of view of one of the two cameras, designated as the selected camera, and displays a magnified representation of the object on the display. The first camera has a first working range adapted for providing images of objects located near the handheld magnification device, while the second camera has a second working range that permits image acquisition of objects located farther from the handheld magnification device. Advantageously, embodiments of the present invention allow toggling between the first and second cameras in a manner that is transparent and seamless to a user. Further advantageously, the handheld magnification device according to embodiments of the present invention allow displaying a sharp magnified representation of an object continuously over a broad working range encompassing the first and second working ranges of the first and second cameras, respectively.

Embodiments of the present invention may be particularly useful in any application where it is necessary to provide sight enhancement and magnification to individuals suffering from low vision or other visual impairments. While the term "low-vision individuals" is sometimes defined as referring to particular levels of visual acuity, one of ordinary skill in the art will understand that the handheld magnification device in accordance with embodiments of the invention may be used by any person requiring a device capable of magnifying text, images, physical items and articles, or any other desired features of interest. In some embodiments, the magnification system may be of use to legally blind individuals.

Throughout the present description, the term "handheld" is understood to refer to a magnification device that is both small and light enough to be readily held in and operated by one or both hands of a user. Furthermore, the handheld magnification device should be portable, so that it may be easily carried in a pocket, a purse or the like. However, while embodiments of the present invention are referred to as "handheld" and may be used as standalone portable devices, the handheld magnification device may, in some embodiments, be connected to and used in combination with stationary equipment without departing from the scope of the present invention. For example, in some embodiments, such as in FIG. 10, the handheld magnification device according to the present invention could be removably docked to a base station including a frame structure and a monitor, as is described in co-pending and co-assigned patent application entitled "Magnification system", filed concurrently with the present application, the contents of which are incorporated herein by reference in their entirety.

As used herein, the term "magnification" is understood to refer to the ratio of the image of the object displayed by the handheld magnification device to the size of the object. In this regard, it should be mentioned that the term "representation" rather than "image" is used herein to refer to the magnified output displayed by the handheld magnification device. In addition to providing an enlarged image of the object, the enlarged image may be further manipulated, formatted, treated, subjected to contrast enhancement or otherwise processed in order to yield the magnified representation of the object.

As known by one of ordinary skill in the art, different types of magnification may be considered, such as optical magnification, digital magnification, and native magnification. The term "optical magnification" is intended to refer herein to the enlargement (or reduction) of the object which is mainly achieved by optical components of the handheld magnification device due to an increase in size of the light beam entering the handheld magnification device. In contrast, the term "digital magnification" refers to a process whereby an input image is digitally (e.g. electronically) magnified, typically by applying a two-dimensional linear scaling with interpolation on the input image or on a portion thereof so as to obtain a digitally magnified image. Furthermore, the term "native magnification" is understood to refer to a process of pixel enlargement, which is the result of the transfer of the image of an object acquired by handheld magnification device on an image sensor thereof having a given pixel size to the magnified representation of the object displayed by the handheld magnification device on a display having a different (e.g. larger) pixel size. All these types of magnifications and various combinations thereof are considered within the scope of the present invention.

The term "object" is meant to encompass any structure, feature or information of interest whose magnified representation is to be displayed. The object to be magnified may include tri-dimensional structures, handwritten or printed text, images, symbols, graphics and the like. Alternatively or additionally, the object to be magnified may include the hands or another appropriate body part of a person (e.g. a user of the handheld magnification device). It will be understood that in such embodiments, the handheld magnification device may provide a magnified representation of the hands of the user while he or she is performing manual tasks. One of ordinary skill in the art will understand that the terminology "object" is not intended to be limiting.

Furthermore, the expression "see-through manner" is used herein to indicate that the magnified representation of the object is to appear to a user as if viewed through the handheld magnification device, that is, as if the handheld magnification device were transparent or absent and the magnified representation of the object was looked at directly through the user's eyes.

Figure 2:
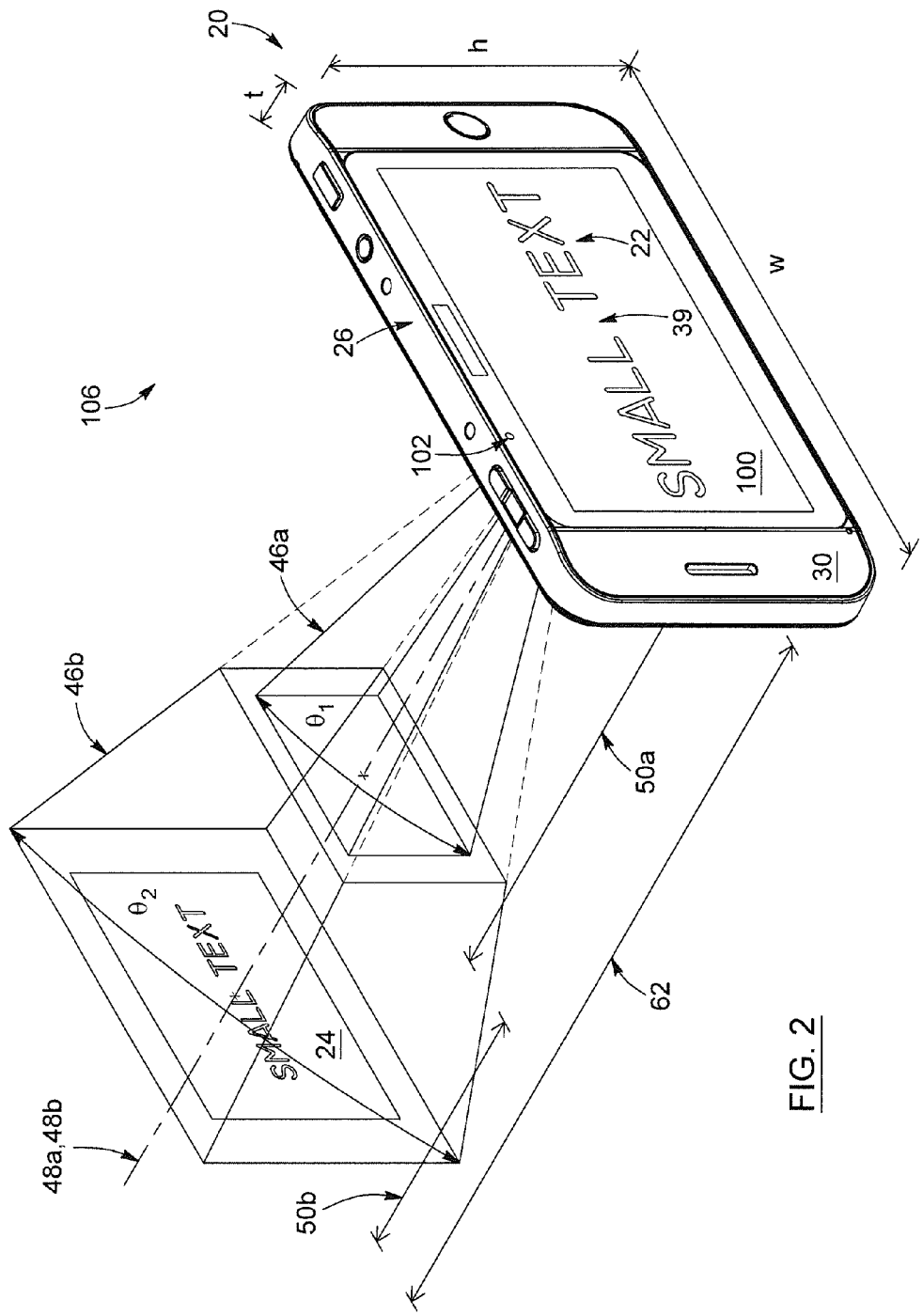
FIG. 2 is another perspective view of a handheld magnification device in accordance with an embodiment of the invention, wherein the display face of the handheld magnification device is shown.

Referring now to FIGS. 1 and 2, there are shown perspective views of a handheld magnification device 20 for displaying a magnified representation 22 of an object 24 in a see-through manner, in accordance with an embodiment of the invention. In the illustrated embodiment, the object 24 is embodied by a sheet of paper having text printed thereon. However, as mentioned above, the object 24 to be magnified may include any feature of interest whose magnified representation is to be displayed. It should also be understood that the elements of the drawings are not necessarily drawn to scale and that the emphasis is instead being placed upon clearly illustrating the principles of operation of the handheld magnification device 20.

The handheld magnification device 20 first includes a casing 26 having a camera face 28 for pointing toward the object 24 and a display face 30 opposite to the camera face 28. It will be understood that the casing 26 defines the overall shape of the handheld magnification device 20, and houses, supports and protects various components of the handheld magnification device 20, which will be described in further detail below. One of ordinary skill in the art will also understand that in use, the camera face 28 should be directed toward the object 24, while the display face 30 should be directed toward a user.

The casing 26 may be shaped as a rectangular prism of width w, height h, and thickness t, and may include rounded corners for easy holding and handling of the handheld magnification device 20. Preferably, the casing 26 has an ergonomic shape to facilitate grasping and holding of the handheld magnification device 20. In some embodiments, the casing 26 may be provided with a handle for gripping by a user. The width w, height h and thickness t, may be selected so as be between about 80 and 200 millimeters, 50 and 150 millimeters, and 5 and 30 millimeters, respectively. For example, in the illustrated embodiment, w=160 millimeters, h=87 millimeters and t=16.5 millimeters. However, it is to be understood that these dimensions are given for purposes of illustration only and are not to be construed as limiting. Furthermore, it will also be understood that in other embodiments, the casing 26 may assume a variety of shapes other than rectangular (e.g. circular, semi-circular, square, elliptical, oval, or trapezoidal) and that both or either of the camera and display faces 28 and 30 may have a shape, structure or texture differing from a smooth flat surface without departing from the scope of the invention.

As depicted in FIGS. 1 and 2, the height h and width w of the casing 26 defines the geometrical dimensions of the camera 28 and display 30 faces thereof. It will be understood that the width-to-thickness and height-to-thickness ratio is preferably large, so as to ensure that the handheld magnification device 20 has a large enough display face 30 while remaining sufficiently thin for ease of holding by a user.

The camera face 28 of the casing 26 preferably consists of a thin rectangular shell 32 made of lightweight yet strong material, for example a molded plastic shell. In the illustrated embodiment, the camera face further includes a transparent window 34 (e.g. a glass window or a hard plastic window) that protects various exposed components of the handheld magnification device 20 and allows images of the object 24 to be acquired by letting optical radiation (e.g. light) from the object 24 pass therethrough. The display face 30 provides an output interface for displaying the magnified representation 22 of the object 24, and may also provide an input interface that accepts input from a user based on haptic and/or tactile contact. In such embodiments, the display face 30 typically defines, on at least a portion thereof, a touch screen including a touch-sensitive surface. Alternatively or additionally, one or more control buttons may be provided on the input interface of the display face 30 or somewhere on the casing 26.

Still referring to FIGS. 1 and 2, the handheld magnification device 20 also includes a first 36a and a second 36b camera both adapted to acquire an image of the object 24. An exemplary disposition of the first and second cameras 36a and 36b on the camera face 28 is better illustrated in FIG. 3, which shows an enlarged view of the camera face 28 of a handheld magnification device 20 according to an embodiment of the invention. It will be understood that the first and second cameras 36a and 36b are preferably disposed on the camera face 28 according to a configuration that minimizes the separation therebetween. Furthermore, it will also be understood by one of ordinary skill in the art that, in order to enhance and optimize the see-through nature of the display of the magnified representation 22 of the object 24 achieved by embodiments of the present invention, the first and second cameras 36a and 36b can be located in a central region 37 of the camera face 28, so as to coincide with a central region 39 of the display face 30 (see FIG. 2) toward which a user's eyes are typically primarily be directed when using the handheld magnification device 20. However, in other embodiments, the first and second cameras 36a and 36b may be located away from the central region 37 of the camera face 28, while still preserving the see-through nature of the display achieved by the handheld magnification device 20. In some of these embodiments, this may be realized by using an appropriate arrangement of one or more reflective optical elements (e.g. mirrors).

It is to be noted that while the handheld magnification device includes two cameras in the embodiments described below, one of ordinary skill in the art will understand that in other embodiments, the handheld magnification device may be provided with more than two cameras without departing from the scope of the present invention.

Throughout the present description, the term "camera" refers to any device or component capable of acquiring an image of an object of interest. More particularly, the term "camera" is meant to encompass the imaging elements (e.g. the imaging optics such lens and mirrors, and the image sensor) and the camera circuitry associated therewith which collectively are used to acquire such an image, which may be a still image or a video stream. In some embodiments, the first and second cameras are preferably high-resolution digital cameras, although lower resolution cameras or non-digital devices may be used without departing from the scope of the present invention.

Figure 4:
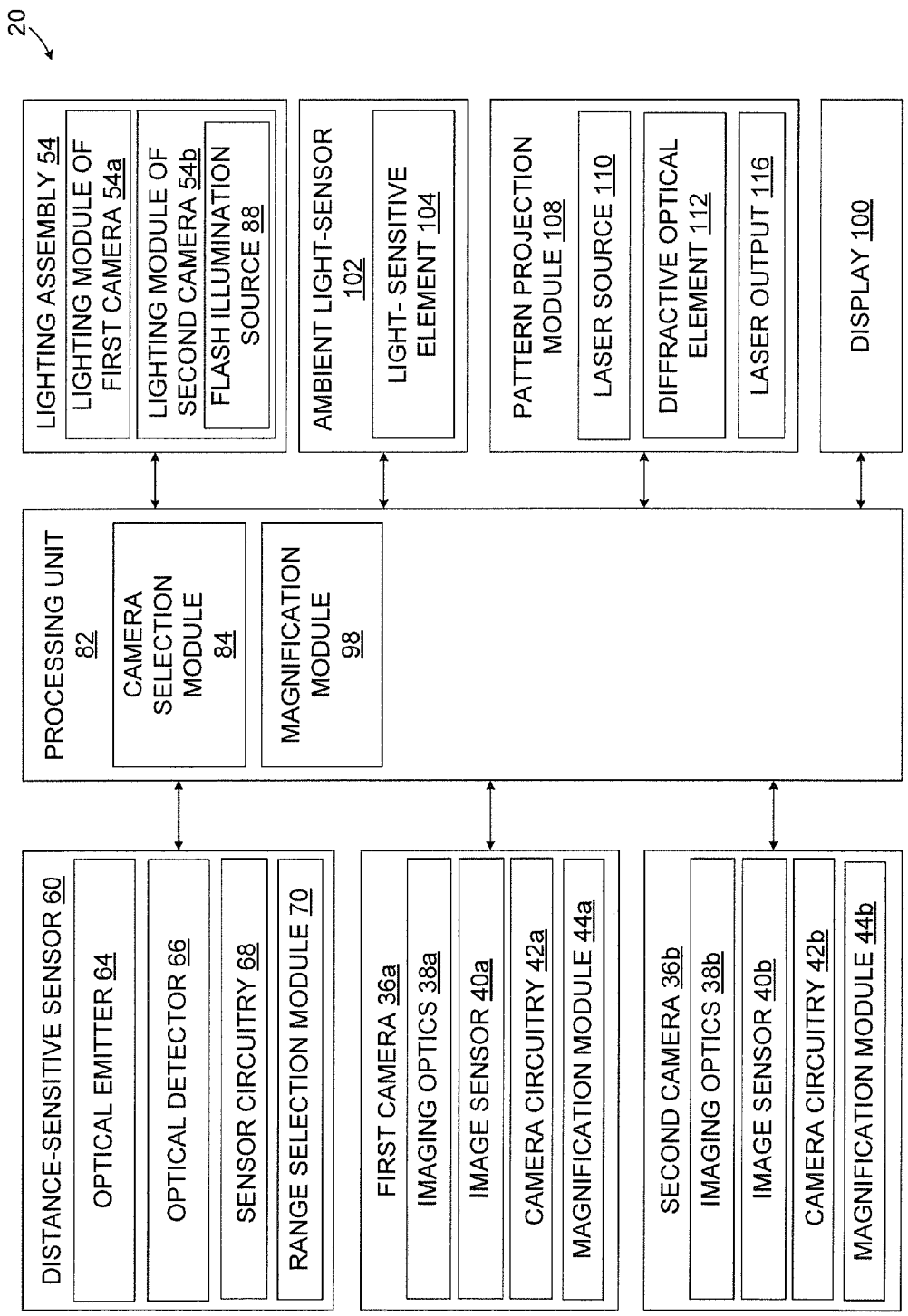
FIG. 4 is a schematic functional block diagram of a handheld magnification device in accordance with an embodiment of the present invention, wherein the distance-sensitive sensor includes a range selection module.

Referring to FIG. 4, there is a shown a schematic functional block diagram of a handheld magnification device 20 in accordance with an embodiment of the present invention. In this exemplary embodiment, each of the first and second cameras 36a and 36b includes imaging optics 38a and 38b, an image sensor 40a and 40b, and camera circuitry 42a and 42b.

As used herein, the term "imaging optics" is understood to refer to one or several optical components adapted to collectively project or direct optical radiation from an object in a scene onto a detector (e.g. an image sensor). Imaging optics 38a and 38b according to embodiments of the present invention may include one or several lenses, as well as optical components other than lenses (e.g. mirrors, filters, polarizers and the like). In particular, lenses are not limited to transparent refractive to optical components but may also include diffractive, reflective optical components and a combination thereof.

The imaging optics 38a and 38b of the first and second cameras 36a and 36b may include either an autofocus or a fixed-focus lens for the acquisition of images. For example, in a preferred embodiment, the second camera 36b, which is adapted for imaging objects located farther from the handheld magnification device 20, is provided with an autofocus lens whose proper focus may be set automatically using a small motor that adjusts the position of the lens until an appropriately sharp image is acquired. On other hand, in this preferred embodiment, the first camera 36a, which is adapted for imaging objects located near the handheld magnification device 20, is provided with a fixed-focus lens, that is, a lens whose focus is not adjustable. As will be understood by one of ordinary skill in the art, a fixed-focus lens generally relies on a sufficiently large depth of field for producing acceptably sharp images of an object, rather than relying on automatically determining the appropriate focusing distance and setting the lens in proper focus. Therefore, in this embodiment, the first camera 36a may further be provided with a spatially limited aperture (e.g. a pinhole aperture) so as to increase the depth of field.

The imaging optics 38a and 38b may provide optical magnification of the image that is projected onto the image sensors 40a and 40b. In such embodiments, the magnified representation of the object is thus generated, at least partly, by an optical magnification thereof. In some embodiments, the imaging optics 38a and 38b of the first and second cameras 36a and 36b may be able to provide an optical magnification of the object of between about 1× and 5× in some embodiments, between about 1× and 10× in other embodiments, and between about 1× and 22× in yet other embodiments.

The term "image sensor" as used throughout this description refers to any photosensitive device able to detect optical radiation emitted or reflected by an object and use it to generate an image of the object based on the detected optical radiation. More particularly, an image sensor may be composed of a linear or two-dimensional array of light-sensitive elements (i.e. pixels), the number of which defines the resolution of the camera. In embodiments of the invention, the first and second cameras 36a and 36b may have a resolution of at least 0.25 and 5 megapixels, respectively. For example, in one embodiment, the first camera 36a has a resolution of 2.1 megapixels corresponding to an array size of 1920×1080 pixels, and the second camera 36b has a resolution of 8 megapixels corresponding to an array size of 3264×2448 pixels.

As will be described in detail below, it will be understood by one of ordinary skill in the art that the resolution of the second the camera 36b is preferably higher than the resolution of the first camera 36a since the second camera 36b is primarily intended for imaging objects that are located farther away from the camera face than the first camera 36a. However, it should also be understood that embodiments of the handheld magnification device should be not limited by the resolution of the first and second cameras and that numerous resolution combinations are understood to be encompassed within the scope of the present invention.

With continuing reference to FIG. 4, each of the image sensors 40a and 40b is adapted to receive optical radiation from the object, projected through the corresponding imaging optics 38a and 38b, and converts it into electrical data representing an image of the object. The image sensors 40a and 40b are preferably embodied by complementary metal-oxide-semiconductor (CMOS) or charge-coupled device (CCD) pixel sensors, but other types of image sensors (e.g. charge injection devices or photo diode arrays) could be used without departing from the scope of the present invention.

The term "camera circuitry" is understood to refer herein to electronic components within the first and second cameras 36a and 36b which receive the electrical data representing the image of the object from the image sensors 40a and 40b, and process this image in a usable format. It will be understood by one of ordinary skill in the art that, in practice, the camera circuitry 42a and 42b may include a plurality of modules, components, communication ports, software and the like cooperating together in order to process the image of the object received from the image sensors 40a and 40b. It will be further understood that these elements of the camera circuitry 42a and 42b may be provided internally or externally to the first and second cameras 36a and 36b, or may be shared between the first and second cameras 36a and 36b in a separate processing unit, as will be described below, without departing from the scope of the present invention.

In some embodiments, the first and second cameras 36a and 36b include a magnification module 44a and 44b for generating the magnified representation of the object based on a digital magnification thereof. As mentioned above, the term "digital magnification" refers, in contrast to the term "optical magnification" defined above, to a process whereby an input image is digitally (e.g. electronically) magnified, typically by applying a two-dimensional linear scaling with interpolation on the input image or a portion thereof so as to obtain a digitally magnified image. As understood by one of ordinary skill in the art, such interpolation generally involves digitally creating pixels of the digitally magnified image in order to reach higher magnifications. Various interpolation or scaling algorithms may be used in the process, including but not limited to, bilinear and bicubic interpolation algorithms.

Referring back to FIGS. 1 and 2, each of the first and second cameras 36a and 36b has a corresponding field of view 46a and 46b extending from the camera face 28 of the casing 26. As used herein, the term "field of view" generally refers to the solid angular extent of a given scene that is imaged by a camera. In particular, since light received by the imaging optics 38a and 38b is projected on the image sensors 40a and 40b, the shape of the fields of view 46a and 46b of the first and second cameras 36a and 36b as a whole is generally defined or limited by the shape of the image sensor 40a and 40b. However, in some embodiments, the shape of the fields of view 46a and 46b of the first and second cameras 36a and 36b may be defined or limited by the imaging optics 38a and 38b thereof. The field of view may be rectangular, square, circular, elliptical, or another shape. When the field of view is a rectangle, as in the embodiment of FIGS. 1 and 2, it may be described in terms of a "diagonal field of view" which represents, as will be apparent to one of ordinary skill in the art, the field of view measured diagonally, that is, from one corner of the rectangle to its opposite corner.

In the illustrated embodiment, each field of view 46a and 46b is depicted as a rectangular-based pyramid that widens outwardly with increasing distance from the camera face 28. Each pyramid may be described by an angle $\theta_1$ and $\theta_2$ characterizing the size or extent of the diagonal field of view 46a and 46b thereof, and by an optical axis 48a and 48b, which generally coincides with an optical axis of the imaging optics 38a and 38b of the first and second cameras 36a and 36b represented in FIG. 3. It should be understood that, in practice, the optical axes 48a and 48b associated with the first and second cameras 36a and 36b do not coincide but are slightly shifted relative to each other. However, this shift is generally small enough that the optical axis 48a and 48b can be considered as coinciding from a practical standpoint and illustrated as such.

Referring back to FIGS. 1 and 2, each of the first and second cameras 36a and 36b preferably has a large field of view 46a and 46b, that is, a diagonal field of view of a least 60 degrees. For example, in an embodiment the first and second cameras 36a and 36b have a diagonal field of view of 68 and 66 degrees, respectively. Moreover, it will be understood by one of ordinary skill in the art that the field of view 46a of the first camera 36a may preferably be wide so as to permit image acquisition of close objects over a large area.

Figure 10:
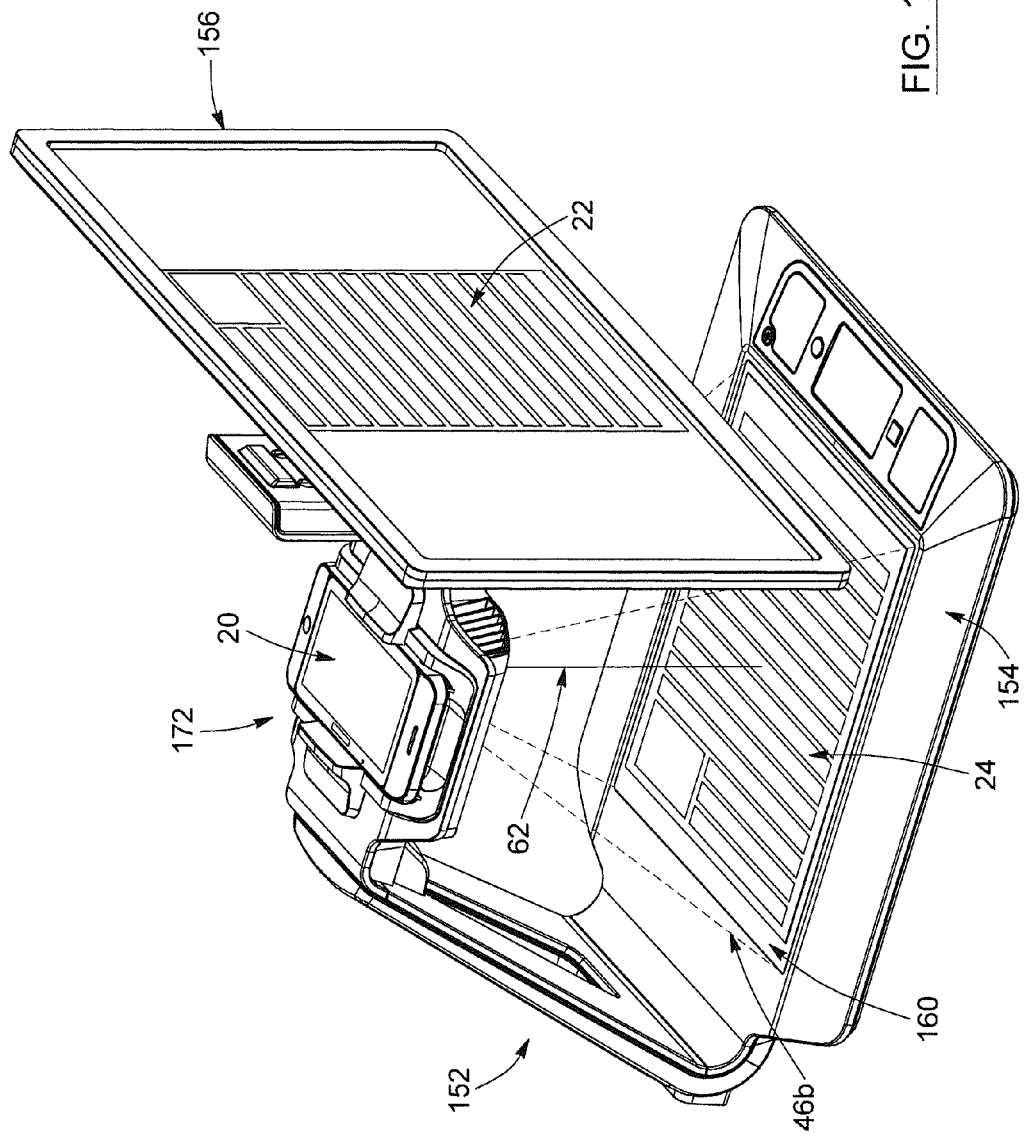
FIG. 10 is a schematic illustration of handheld magnification device in accordance with an embodiment of the invention, wherein the handheld magnification device is removably docked to a base station and provides the magnified representation of an object placed on a workspace of the base station.

In other embodiments such as that illustrated in FIG. 10, it may also be preferable that that the field of view 46b of the second camera 36b be wide. In the exemplary embodiment shown in FIG. 10, the handheld magnification device 20 is removably docked, via a docking assembly 172, to a base station 152 that includes a frame structure 154 and a monitor 156. An example of such a docking assembly is shown in co-pending and co-assigned patent application entitled "Docking assembly for a handheld device", filed concurrently with the present application, the contents of which are incorporated herein by reference in their entirety.

In this embodiment, an object 24, for example a document of a typical letter size (e.g. letter or A4 size) having text or other information inscribed thereon, may be disposed on a workspace 160 of the frame structure 154 and the magnified representation 22 thereof may be generated by the handheld magnification device 20 and displayed on the monitor 156. Typically, in such embodiments, the distance 62 between the object 24 and handheld magnification device 20 is such that the second camera 36b is the selected camera, as described below, which acquires the image of the object 24 whose magnified representation 22 is generated by the handheld magnification device 20 and displayed on the monitor 156. Therefore, in such embodiments, it may be advantageous that the field of view 46b of the second camera 36b be sufficiently wide to permit the handheld magnification device 20 to acquire an image of the entire surface of an object 24 having a typical letter size. Indeed, one limitation of current desktop magnification devices is that they include a camera that has a limited field of view that prevents from acquiring and displaying on a monitor the entire surface of a document having a typical letter size. To allow reading a letter size document, such desktop magnification devices typically include an XY table which the user has to move from right to left to read the first line of the document, from left to right and slightly moving downward to position the next line of the document, from right to left to read the second line of the document, and so on until the end of the document is reached.

Referring back to FIGS. 1 and 2, the first camera 36a has a first working range 50a proximate the handheld magnification device 20 and the second camera 36b has a second working range 50b different from and extending beyond the first working range 50a of the first camera 36a. Therefore, as mentioned above, it will be understood that the first camera 36a is especially adapted for providing images of an object 24 located near the handheld magnification device 20, while the second camera 36b permits image acquisition of an object 24 located farther from the handheld magnification device 20.

Throughout the present description, the term "working range" of a camera refers to the distance interval along the optical axis of the camera within which an object may be located and be resolved into a sufficiently focused image by the camera. Following this definition, each working range 50a and 50b may be characterized by a proximal end and a distal end, the proximal end being located closer to the handheld magnification device 20 than the distal end. Accordingly, it will be understood that in order for the second working range 50b to be different from the first working range 50a, at least one of the proximal and distal ends of the second working range 50b should differ from the corresponding proximal and distal ends of the first working range 50a. Moreover, in order for the second working range 50b to extend beyond the first working range 50a, the distal end of the second working range 50b should be farther from the handheld imaging device than the distal end of the first working range 50a.

It will be understood by one of ordinary skill in the art that, in practice, the proximal ends of the first and second working ranges 50a and 50b are generally both located a certain distance away from the camera face 28. This may be explained on the basis that for most cameras, there is a minimum working distance below which a focused image of an object cannot be formed. However, in some embodiments, the proximal end of one or both of the first and second working ranges 50a and 50b may coincide with the camera face 28 without departing from the scope of the present invention.

Figure 6A:
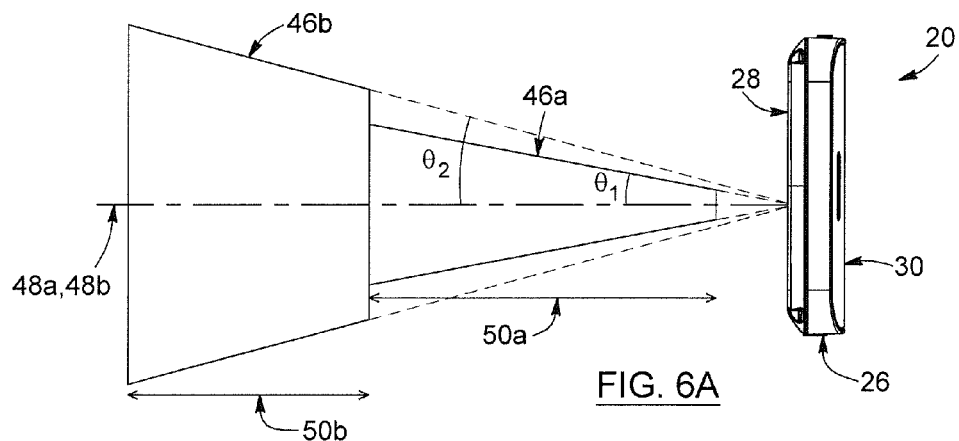
FIGS. 6A to 6C illustrate schematically different configurations that may be assumed by the first and second working ranges of the first and second cameras of a handheld magnification device in accordance with embodiments of the present invention.
Figure 6B:
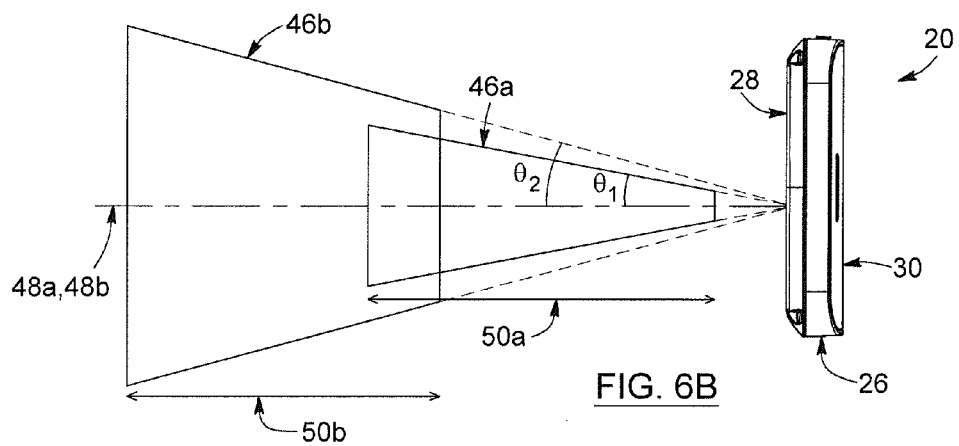
Figure 6C:
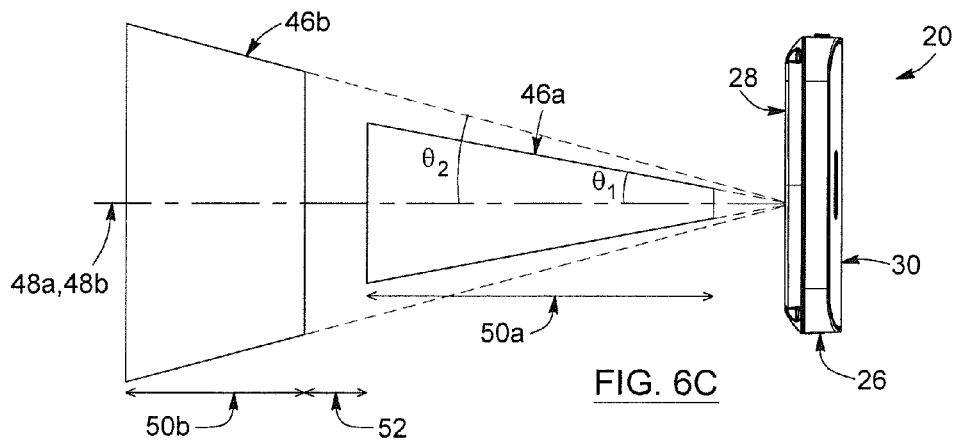

In view of these considerations, FIGS. 6A to 6C illustrate different configurations that may be assumed by the first and second working ranges 50a and 50b of the first and second cameras of a handheld magnification device in accordance with embodiments of the present invention.

In FIG. 6A, the first and second working ranges 50a and 50b are contiguous without overlapping, which also corresponds to the configuration assumed in the embodiment illustrated in FIGS. 1 and 2. For example, in one embodiment, the first working range 50a may extend between about 2 and 10 centimeters from the camera face 28, while the second working range 50b may extend beyond about 10 centimeters from the camera face 28, that is, beyond about 10 centimeters and infinity.

In FIG. 6B, the first and second working ranges 50a and 50b are overlapping over a certain interval of their respective extent.

In FIG. 6C, the first and second working ranges 50a and 50b are separated from each other by an inter-range distance 52. For example, in one embodiment, the first working range 50a may extend between about 2 and 8 centimeters from the camera face 28, while the second working range 50b may extend beyond about 10 centimeters from the camera face 28, that is, beyond about 10 centimeters and infinity. It will be understood by one of ordinary skill in the art that when an object is located within the inter-range distance 52, the magnified representation of the object displayed by the handheld magnification device could be slightly blurred or out of focus.

Referring back to FIGS. 1 to 4, the handheld magnification device 20 may include a lighting assembly 54 projecting illuminating radiation from the camera face 28 of the casing 26 for illuminating the object 24. The lighting assembly 54 may be used to provide flash illumination to the object 24 whose still image is to be acquired by one of the first and second cameras 36a and 36b. Additionally or alternatively, the lighting assembly 54 may be used for illuminating the object 24 while acquiring video images thereof as well as for autofocus operation of the first and second cameras.

In the illustrated embodiment, the lighting assembly 54 may be subdivided into a first lighting module 54a associated with the first camera 36a and a second lighting module 54b associated with the second camera 36b. Preferably, but not necessarily, the first and second lighting modules 54a and 54b become active only upon selection by the processing unit 82 of the first and second cameras 36a and 36b as the selected camera, respectively, as defined below. However, it will be understood by one of ordinary skill in the art that each of the first and second cameras 36a and 36b need not be provided with two distinct lighting modules 54a and 54b and that, depending on the intended applications and specific requirements of the handheld magnification device 20, both cameras may alternatively use the same lighting assembly 54 without departing from the scope of the present invention.

The first and second lighting modules 54a and 54b generally include one or more light-emitting elements 56a and 56b of sufficient strength to allow the first and second cameras 36a and 36b to acquire an acceptable still image of an object 24. The light-emitting elements 56a and 56b of the first and second lighting modules 54a and 54b are preferably embodied by light-emitting diodes (LEDs), which may be white or color LEDs, but other types of light-emitting elements such as cold cathode fluorescent lamps (CCFLs) or assemblies of elements could be used without departing from the scope of the present invention.

Figure 3:
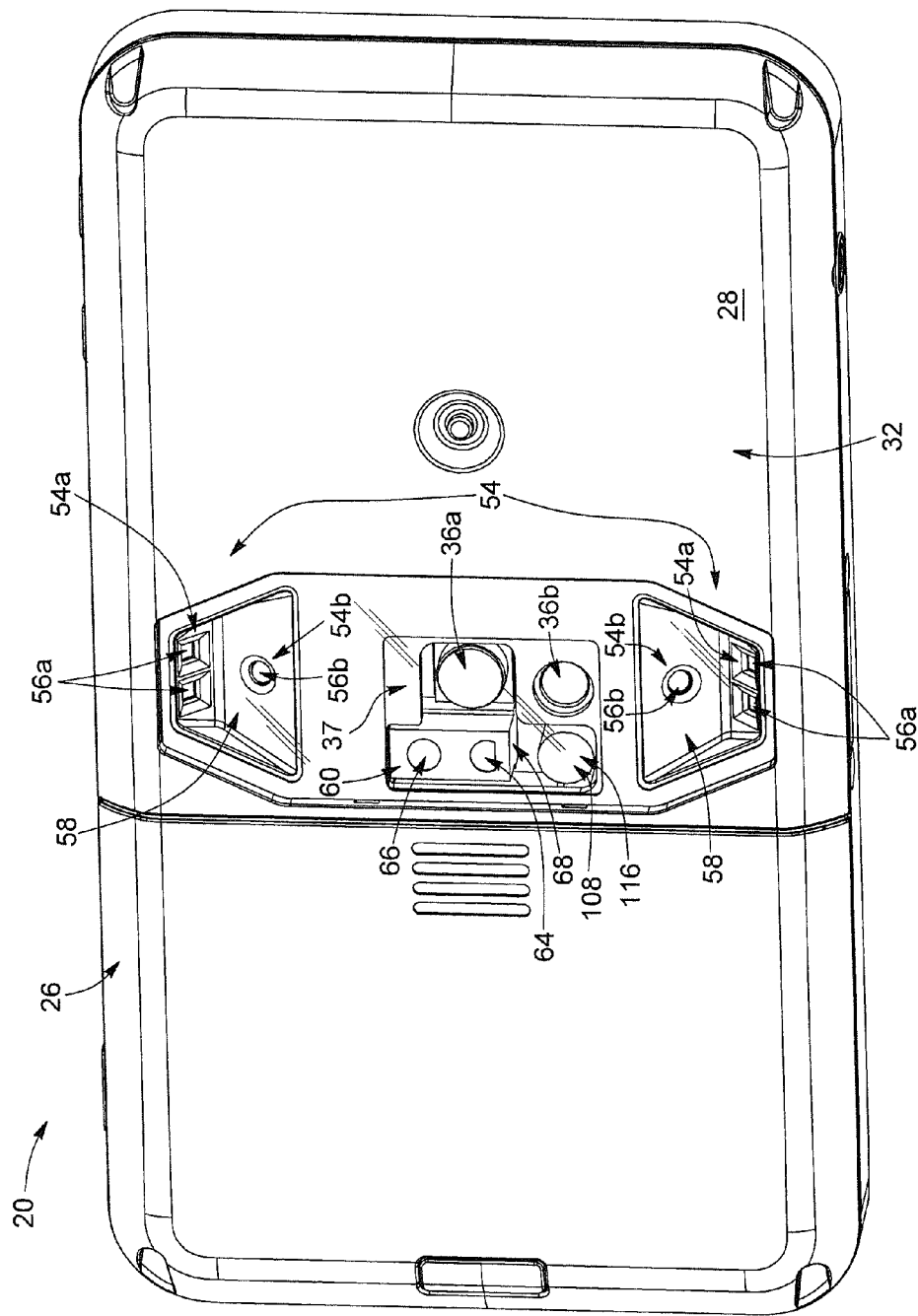
FIG. 3 is an enlarged view of the camera face of the handheld magnification device of FIG. 1.

With continuing reference to FIGS. 1 to 4, the first and second lighting modules 54a and 54b include four and two light-emitting elements 56a and 56b, respectively, which are distributed evenly in two recessed areas 58 formed on the camera face 28 of the casing 26. Referring more particularly to FIG. 3, these two recessed areas 58 are generally shaped as inverted pyramids with four side walls. Each of the recessed areas 58 includes two light-emitting elements 56a of the first lighting module 54a inscribed on one side and one light-emitting element 56b of the second lighting module 54b inscribed on an opposite side. In the illustrated embodiment, the recessed areas 58 are located under the transparent window 34 and are disposed in a symmetrical fashion above and below the first and second cameras 36a and 36b, thus facilitating uniform lighting of the object 24 by the light-emitting elements 56a and 56b. It will be understood that the orientation of the first and second lighting modules 54a and 54b are preferably set to optimize the amount light in the working ranges 50a and 50b of the first and second cameras 36a and 36b.

In the illustrated embodiment, the lighting module 54a of the first camera 36a is located farther from the first and second cameras 36a and 36b than the lighting module 54b of the second camera 36b. As one of ordinary skill in the art will understand such a configuration may be advantageous because, as mentioned above, the first camera 36a is adapted for acquiring images of objects located near the handheld magnification device 20. Therefore, the lighting module 54a of the first camera 36a is preferably disposed as far as possible from the first camera 36a to avoid glare, light reflections or other sources of direct illumination into the image sensor 40a. For example, in FIG. 3, the first camera 36a is located in the central region 37 of the camera face 28 and the first lighting module 54a is disposed along the edge of the camera face 28 so as to be distal from the first camera 36a. Furthermore, in embodiments where the first camera 36a is provided with a spatially limited aperture for increasing the depth of field thereof, one of ordinary skill in the art will understand that the first lighting module 54a may be configured so as to compensate for the reduced amount of light that reaches the image sensor 40a of the first camera 36a. Preferably also, when the second camera captures still images, the lighting module 54b of the second camera 36b is used as a flash illumination source 88 in order to provide more light to the image sensor 40b of the second camera 36b since the working range 50b of the second camera 36b extends beyond the working range 50a of the first camera 36a.

However, one of ordinary skill in the art will also understand that the exemplary lighting assembly 54 discussed herein with reference to FIGS. 1 to 4 is given for illustrative purposes and that the lighting assembly 54 may assume other symmetrical or non-symmetrical configurations without departing from the scope of the present invention. In particular, the number, arrangement, orientation and relative positioning of the light-emitting elements 56a and 56b of the first and second lighting modules 54a and 54b should not to be construed as limiting.

Still referring to FIGS. 1 to 4, the handheld magnification device 20 also includes a distance-sensitive sensor 60 for measuring in real-time a distance parameter representative of a distance 62 between the object 24 and the handheld magnification device 20.

Throughout the present description, the term "distance-sensitive sensor" is understood to refer broadly to any device, component, element, configuration or combination thereof able to obtain distance information of a remote object located some distance away therefrom and to output a distance parameter indicative of that distance.

In some embodiments, the distance-sensitive sensor 60 may be embodied by a component specifically used for distance sensing purposes, such as an off-the-shelf distance-sensitive sensor or a distance-sensitive sensor included with one or the both of the first and second cameras 36a and 36b. However, in embodiments where one or both of the first and second cameras 36a and 36b include an autofocus lens, distance-sensing capabilities could alternatively be provided by establishing a correlation between the position of the autofocus lens and the distance 62 to the object 24, thereby embodying the distance-sensitive sensor 60. Furthermore, it will be understood by one of ordinary skill in the art that, in some embodiments, the distance-sensitive sensor 60 may rely on the data collected by both a specifically dedicated distance-sensing detector and the autofocus lens of one or both of the first and second cameras 36a and 36b to output the distance parameter representative of the distance 62 between the object 24 and the handheld magnification device 20.

The term "real-time" is used herein as a practical term depending upon the requirements of an intended application of the handheld magnification device 20 and generally refers to the fact that the distance-sensitive sensor 60 may be able to measure time variations of the distance parameter as they occur, that is, with negligible or insignificant time lag. As will be discussed in further detail below, the distance-sensitive sensor 60 according to embodiments of the present invention is preferably able to measure time variations of the distance parameter on a sufficiently short time scale for allowing the handheld magnification device 20 to display the magnified representation 22 of the object 24 as well as toggling or switching between the first and second cameras 36a and 36b seamlessly on the typical scale of human perception.

It will be understood that the distance-sensitive sensor 60 may operate according to various acquisition principles and may be based on sensing technologies including optical shadow, optical visual light, optical infrared, optical color recognition, ultrasonic, acoustic emission, radar, heat, sonar and the like. This list is not meant to be limiting. It will also be understood that in some embodiments, more than one distance-sensitive sensor 60 may be provided without departing from the scope of the present invention.

Referring more specifically to FIG. 4, the distance-sensitive sensor 60 may include an optical emitter 64, e.g. one or more LEDs, for emitting light toward an object 24 whose distance from the handheld magnification device 20 is of interest, an optical detector 66, e.g. one or more photodiodes, adjacent the optical emitter 64 and configured for detecting light reflected from the object 24, and sensor circuitry 68 connected to the optical detector 66 and adapted to output the distance parameter based on the light that is reflected from the object and subsequently detected by the optical detector 66.

Preferably, the optical emitter 64 and detector 66 are embodied by an infrared emitter and detector, respectively, but optical emitters and detectors covering other regions of the electromagnetic spectrum may be used without departing from the scope of the present invention. Advantageously, the optical detector 66 may have peak sensitivity at a wavelength that substantially matches a peak emission wavelength of the optical emitter 64.

In some embodiments, the distance-sensitive sensor 60 according to embodiments of the present invention can reliably and consistently detect objects 24 of different size, shape, composition, color, texture, and surface finish (e.g. matte, lustrous, glittering), which may be placed against various background and in various ambient light conditions. Furthermore, in embodiments where the distance-sensitive sensor 60 uses an infrared emitter and detector and considering that a dark object or an object with a matte surface finish absorb more infrared light, the luminance of the object may need to be taken into account in order to improve the ability of the distance-sensitive sensor 60 to accurately and reliably determine the distance parameter of a dark object or of an object with a matte surface finish. In some of these embodiments, this may be realized by using information collected by the first and second cameras 36a and 36b, such as scene brightness, in order to validate or correct the distance parameter outputted by the distance-sensitive sensor 60.

The sensor circuitry 68 of the distance-sensitive sensor 60 may refer to various electronic components configured to receive and process electrical data (e.g. voltage or current) representative of the reflected light detected by the optical detector 66, and to output the distance parameter representative of the distance 62 between the object 24 and the handheld magnification device 20. It will be understood by one of ordinary skill in the art that the sensor circuitry 68 of the distance-sensitive sensor 60 may include a plurality of components (e.g. LED drivers, amplifiers, analog-to-digital converters, oscillators, processor, and the like) and communication ports cooperating together in order to process the electrical data received from the optical detector 66.

In some embodiments, the distance parameter outputted by the distance-sensitive sensor 60 may be a length value corresponding to the distance 62 between the object 24 and the handheld magnification device 20. In other embodiments, the distance parameter may be some other physical quantity, for example a voltage or an electrical current, from which the distance 62 may be retrieved or extracted using calibration data. In yet other embodiments wherein the first and second working ranges 50a and 50b are contiguous without overlapping (see, e.g. FIG. 6A), the distance parameter may be a binary-valued distance parameter. This binary-valued distance parameter may have a first value when the object 24 is identified as being in the first working range 50a and a second value when the object 24 is identified as being in the second working range 50b (see, e.g. FIGS. 1 and 2).

More particularly, in these latter embodiments, the distance-sensitive sensor 60 may include a range selection module 70 for outputting the distance parameter as a binary-valued function having a first output value when the object 24 is identified as being in the first working range 50a and a second output value when the object 24 is identified as being in the second working range 50b. For example, in the embodiment illustrated in FIGS. 1 and 2, the object 24 is located in the second working range 50b and the distance parameter outputted by the range selection module 70 of the distance-sensitive sensor 60 would take on the second output value thereof.

Figure 7:
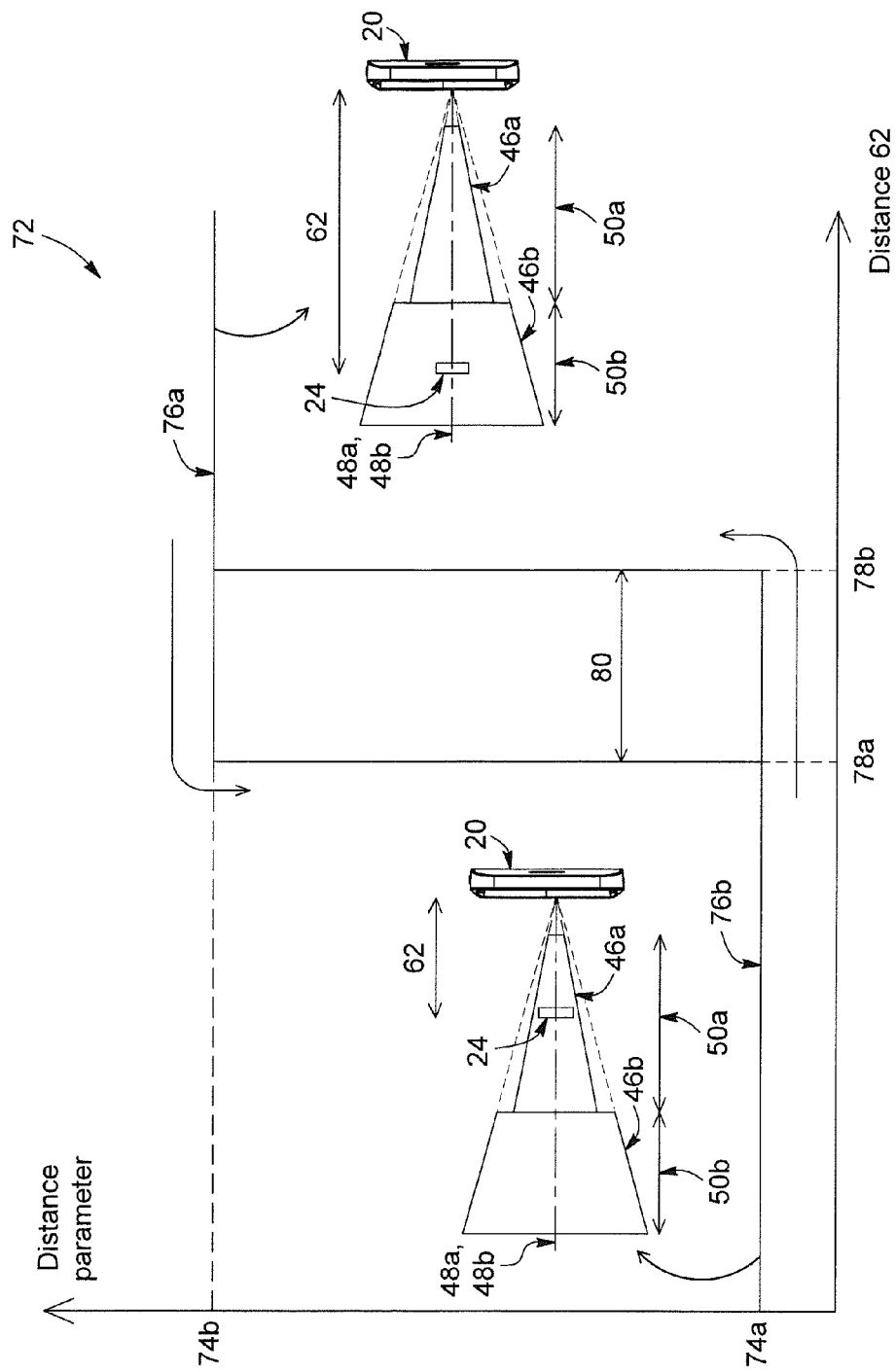
FIG. 7 is graph of the distance parameter outputted by the range selection module of the distance-sensitive sensor as a function of the distance between the object and the handheld magnification device, in accordance with an embodiment of the present invention, wherein the distance parameter is a hysteretic function of the distance between the object and the handheld magnification device.

Referring now to FIG. 7, there is shown a graph of the distance parameter outputted by the distance-sensitive sensor 60 such as that illustrated in FIG. 4 as a function of the distance 62 between the object 24 and the handheld magnification device 20. In particular, upon inspection of the graph, it may be seen that the distance parameter outputted by the range selection module 70 is, in this embodiment, a hysteretic function 72 of the distance 62 between the object 24 and the handheld magnification device 20.

As used herein, the term "hysteretic function" generally refers to a function whose output to a particular input may assume one of a plurality (e.g. two) possible output states depending on whether that previous input was higher or lower than the particular input. In other words, the term "hysteresis" refers to the difference between two output values that correspond to a same given input, depending on the direction (i.e. increasing or decreasing) from which that given input is approached.

More particularly, the hysteretic function 72 is a binary-valued function having a first output value 74a when the object 24 is identified as being in the first working range 50a and a second output value 74b when the object 24 is identified as being in the second working range 50b. It will be understood that although in FIG. 7 the output value 74a of the hysteretic function 72 corresponding to the object 24 being identified as being in the first working range 50a is smaller than the output value 74b of the hysteretic function 72 corresponding to the object 24 being identified as being in the second working range 50b, in other embodiments the first output value 74a may alternatively be larger than the second output value 74b.

Furthermore, in the illustrated embodiment, the hysteretic function 72 exhibits a two-level switching behavior characterized by a decreasing branch 76a and an increasing branch 76b along which the distance 62 between the object 24 and the handheld magnification device 20 decreases and increases, respectively. The hysteretic function 72 may be characterized by a first threshold value 78a at which the distance parameter switches from the second output value 74b to the first output value 74a thereof as the distance 62 between the object 24 and the handheld magnification device 20 decreases along the decreasing branch 76a. The hysteresis function 72 may also be characterized by a second threshold value 78b, separated from the first threshold value 78a by a hysteresis width 80, at which the hysteresis function 72 switches from the first output value 74a to the second output value 74b thereof as the distance 62 between the object 24 and the handheld magnification device 20 increases.

For example, in an embodiment wherein the first and second working ranges 50a and 50b extend between about 2 and 10 centimeters and beyond 10 centimeters from the handheld magnification device 20, respectively, the first threshold and second threshold values may be set equal to 8 and 12 centimeters, respectively, corresponding to a hysteresis width 80 equal to 4 centimeters. Accordingly, in this exemplary embodiment, when the distance 62 between the object 24 and the handheld magnification device 20 decreases from 15 centimeters (i.e. in the second working range 50b) down to 9 centimeters (i.e. in the first working range 50a), the distance parameter will remain equal to the second output value 74b thereof and will only switch to the first output value 74a thereof when the object 24 becomes closer than 8 centimeters from the handheld magnification device 20. Conversely, if the distance 62 between the object 24 and the handheld magnification device 20 increases from 5 centimeters (i.e. in the first working range 50a) up to 11 centimeters (i.e. in the second working range 50b), the distance parameter will remain equal to the first output value 74a thereof and will only switch to the second output value 74*b* thereof when the object 24 becomes farther than 12 centimeters from the handheld magnification device 20.

As one of ordinary skill in the art will readily understand, designing the distance parameter as a hysteresis function in a distance interval encompassing the distal end of the first working range associated with the first camera and the proximal end of the second working range associated with the second camera, may be advantageous to avoid undesirable back and forth oscillations between the first and second output values of the distance parameter due to unintentional fluctuations in the position of the object when the object is located near an end of the first and second working ranges of the first and second cameras or, equivalently, near a switching point between the first and second working ranges.

Referring back to FIGS. 1 to 4, the handheld magnification device 20 further includes a processing unit 82 for receiving the distance parameter from the distance-sensitive sensor 60 and for automatically selecting, based on the distance parameter and the first and second working ranges 50*a* and 50*b*, one of the first and second cameras 36*a* and 36*b* as a selected camera.

In the present description, the term "processing unit" is understood to refer to a functional entity of the handheld magnification device 20 that controls and executes, at least partially, the operations required for displaying the magnified representation 22 of the object 24 based on the image acquired by one of the first and second cameras 36*a* and 36*b*, that is, by the selected camera. In particular, as illustrated in FIG. 4, the processing unit 82 is preferably connected to the various elements of the handheld magnification device such the first and second cameras 36*a* and 36*b*, the distance-sensitive sensor 60 and other components to be described below via various input/output (I/O) communication ports, such as camera ports, inter-integrated circuit (I2C) ports, serial peripheral interface (SPI) ports and display ports.

It will be understood by one of ordinary skill in the art that the processing unit 82 may be implemented as a single unit or a plurality of interconnected processing sub-units and may be embodied by a microprocessor, a central processing unit (CPU), a processing core, a microcontroller, a system on a chip (SoC), a digital signal processor (DSP), a programmable logic device, or by any other processing resource or any combination of such processing resources configured to operate collectively as a processing unit. In particular, this terminology should not be construed so as to limit the scope or application of the invention.

The processing unit 82 according to embodiments of the handheld magnification device 20 will be described below as a series of various modules, each associated with one or more different functions. It will be readily understood by one of ordinary skill in the art that, in practice, each module may include a plurality of sub-modules, routines, components, communication ports, software and the like cooperating together in order to accomplish the corresponding function. It will be further understood that the subdivision into such modules is made from a conceptual standpoint only and that, in practice, a given hardware or software component may be shared by different modules, and that components of different modules may be combined together physically and logically without departing from the scope of the present invention. Preferably, the various physical components of the processing unit 82 and the interconnections therebetween are disposed on an integrated circuit (IC) die, which is preferably mounted onto a printed circuit board (PCB).

As used herein, the term "selected camera" refers to the one camera out of the first and second cameras whose image of the object is used in order to form the magnified representation of the object to be displayed by the handheld magnification device.

The term "automatically" is used herein to mean that the processing unit selects one of the first and second cameras as the selected camera without the need for additional input or involvement from the user. Indeed, it will be understood by one of ordinary skill in the art that the processing unit of the handheld magnification device in accordance with embodiments of the present invention advantageously allows selecting the selected camera from one of the first and second cameras as well as toggling or switching between the first and second cameras with negligible or insignificant time lag following reception of the distance parameter from the distance-sensitive sensor. One of ordinary skill in the art will also understand that the selecting of the selected camera and the switching between the first and second cameras are preferably performed on a time scale that is sufficiently short for allowing the handheld magnification device to display the magnified representation of an object in real-time on the typical scale of human perception and over a broad and continuous working range that encompasses the working ranges of the first and second cameras.

Referring now to FIG. 4, when the distance-sensitive sensor 60 includes a range selection module 70 for outputting the distance parameter as a binary-valued function, the processing unit 82 may include a camera selection module 84 for automatically selecting, based on the binary-valued distance parameter, the first and second cameras 36*a* and 36*b* as the selected camera when the distance parameter outputted by the range selection module 70 has the first and second output values, respectively.

Figure 5:
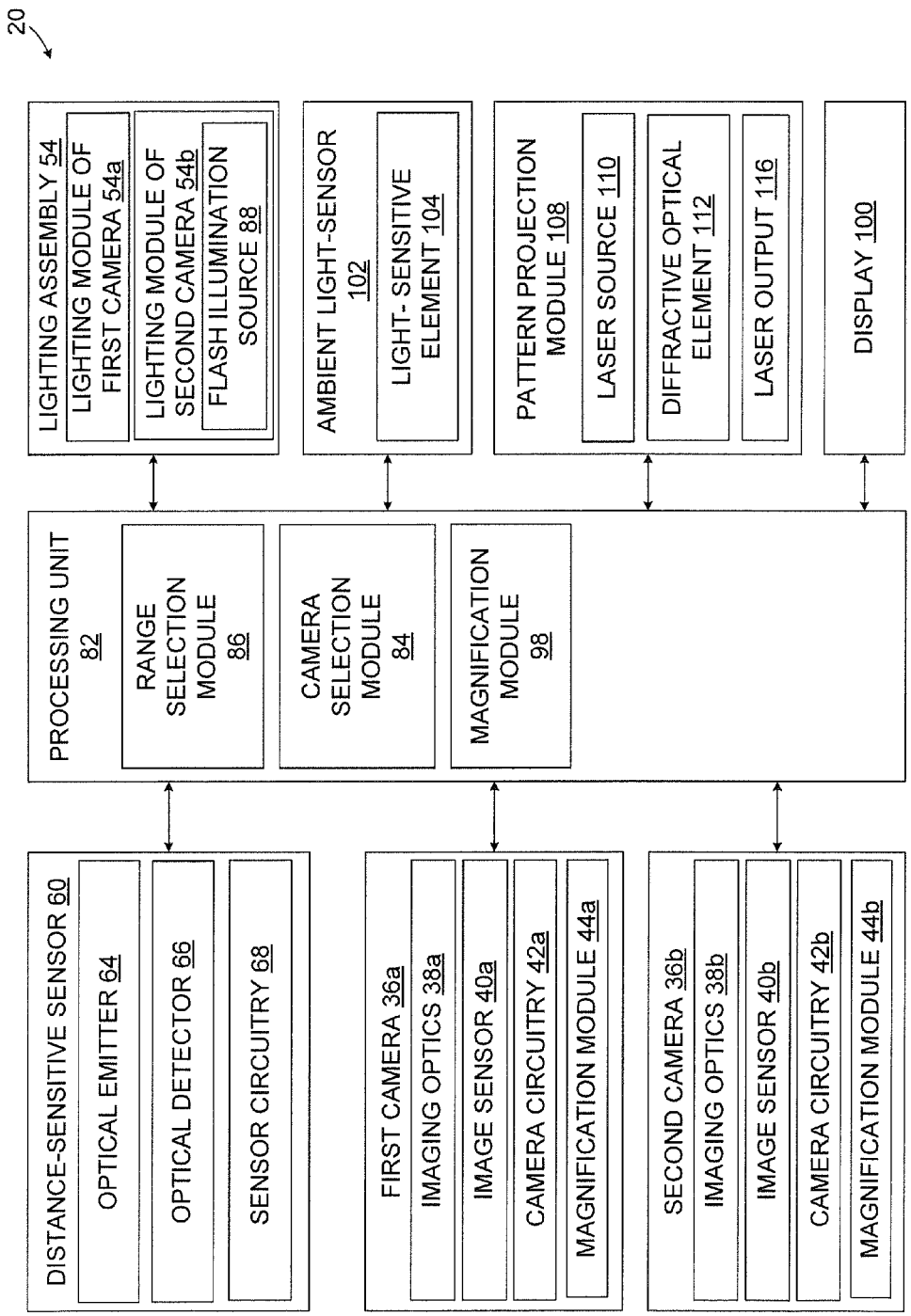
FIG. 5 is a schematic functional block diagram of a handheld magnification device in accordance with an embodiment of the present invention, wherein the processing unit includes a range selection module.

With reference to FIG. 5, in one embodiment where the distance-sensitive sensor 60 does not include a range selection module and where the first and second working ranges 50*a* and 50*b* are contiguous without overlapping (see, e.g., FIG. 6A), the processing unit 82 may itself include a range selection module 86 for receiving the distance parameter from the distance-sensitive sensor 60 and for generating, based on the distance parameter, a binary-valued range selection function. This binary-valued range selection function may have a first output value when the object 24 is identified as being in the first working range 50*a* and a second output value when the object 24 is identified as being in the second working range 50*b* (see, e.g. FIGS. 1 and 2). In such embodiments, the processing unit 82 may also include a camera selection module 84 for automatically selecting the first and second cameras 36*a* and 36*b* as the selected camera when the range selection function has the first and second output values, respectively.

The range selection function generated by the range selection module 86 of the processing unit 82 illustrated in FIG. 5 may also be a hysteretic function of the distance 62 between the object 24 and the handheld magnification device 20. Hence, as described above in connection with the hysteretic function 72 of the distance-sensitive sensor 60 depicted in FIG. 7, the range selection function of the range selection module 86 may be a binary-valued function exhibiting a two-level switching behavior characterized by a decreasing branch and an increasing branch, each having a corresponding threshold value at which the range selection function switches from the first and second output values thereof or vice and versa.

Referring back to FIG. 4, the processing unit 82 may also include a magnification module 98 for generating the magnified representation of the object based on a digital magnification thereof. It will be understood by one of ordinary skill in the art that the magnification module 98 of the processing unit 82 may, but need not, be identical to one or to both of the magnification module 44a and 44b that may be provided with the first and second cameras 36a and 36b. Hence, in embodiments such as that shown in FIG. 4, the first and second cameras 36a and 36b, and the processing unit 82 all include a respective magnification module 44a, 44b and 98, which may be used jointly in order to display the magnified representation of the object at higher magnification level. However, it will also be understood that the first and second cameras 36a and 36b, and the processing unit 82 may not all include a respective magnification module 44a, 44b and 98.

It will be understood that depending on the specific configuration or intended application of the handheld magnification device or on the available processing and computational resources, the non-selected camera (i.e. the one of the first and second cameras that is not the selected camera) may or may not be active (i.e. acquiring images) while images acquired by the selected camera are displayed by the handheld magnification device as the magnified representation of the object. More specifically, in some embodiments, the non-selected camera may be inactive, that is, in a standby or sleep state or be completely turned off. Alternatively, in other embodiments, the non-selected camera may continue acquiring images, even though these images are not displayed by the handheld magnification device.

Figure 8A:
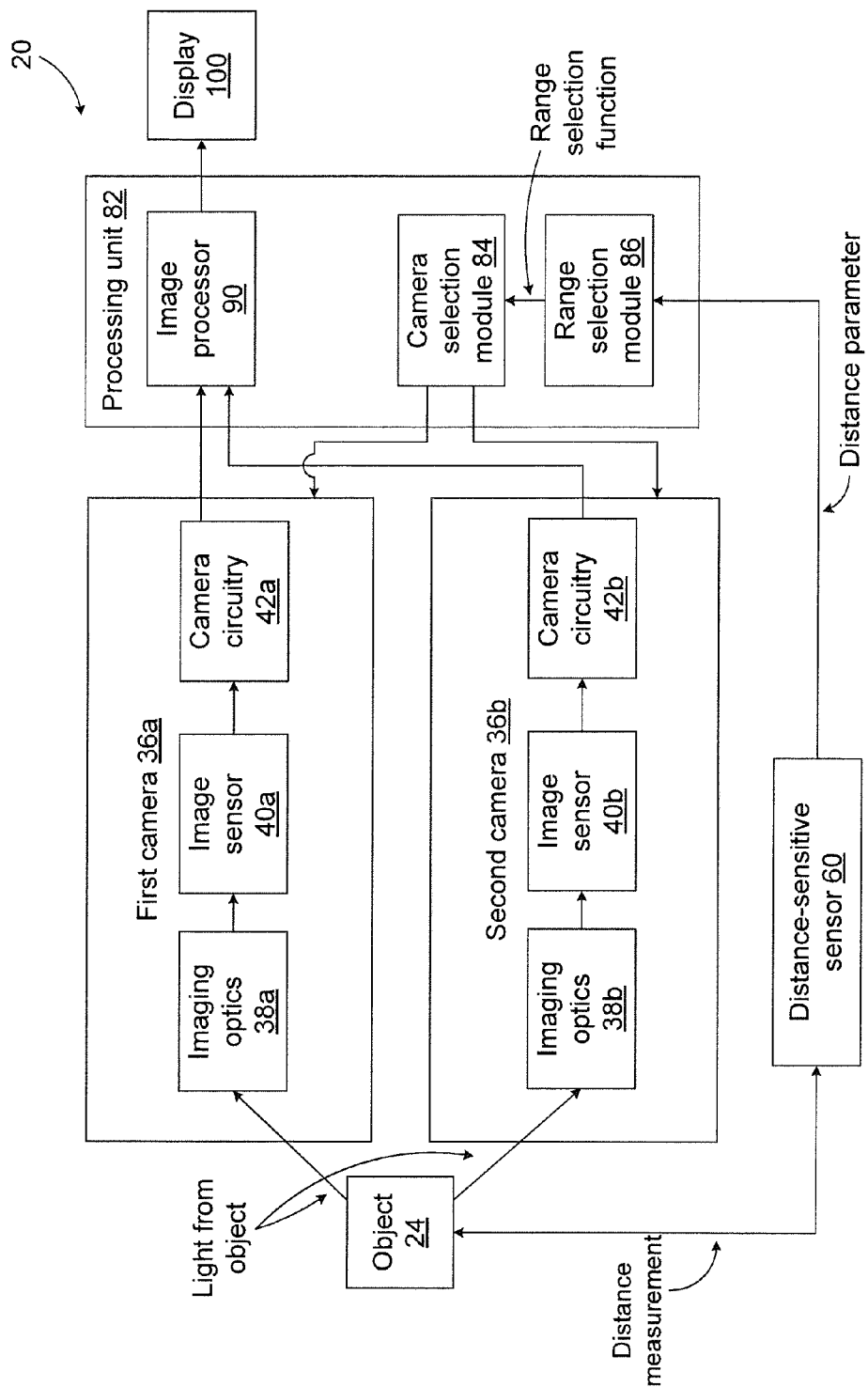
FIGS. 8A and 8B are schematic block diagrams illustrating the components of the handheld magnification device involved in the automatic selection and switching of the selected camera, in accordance with embodiments of the present invention.
Figure 8B:
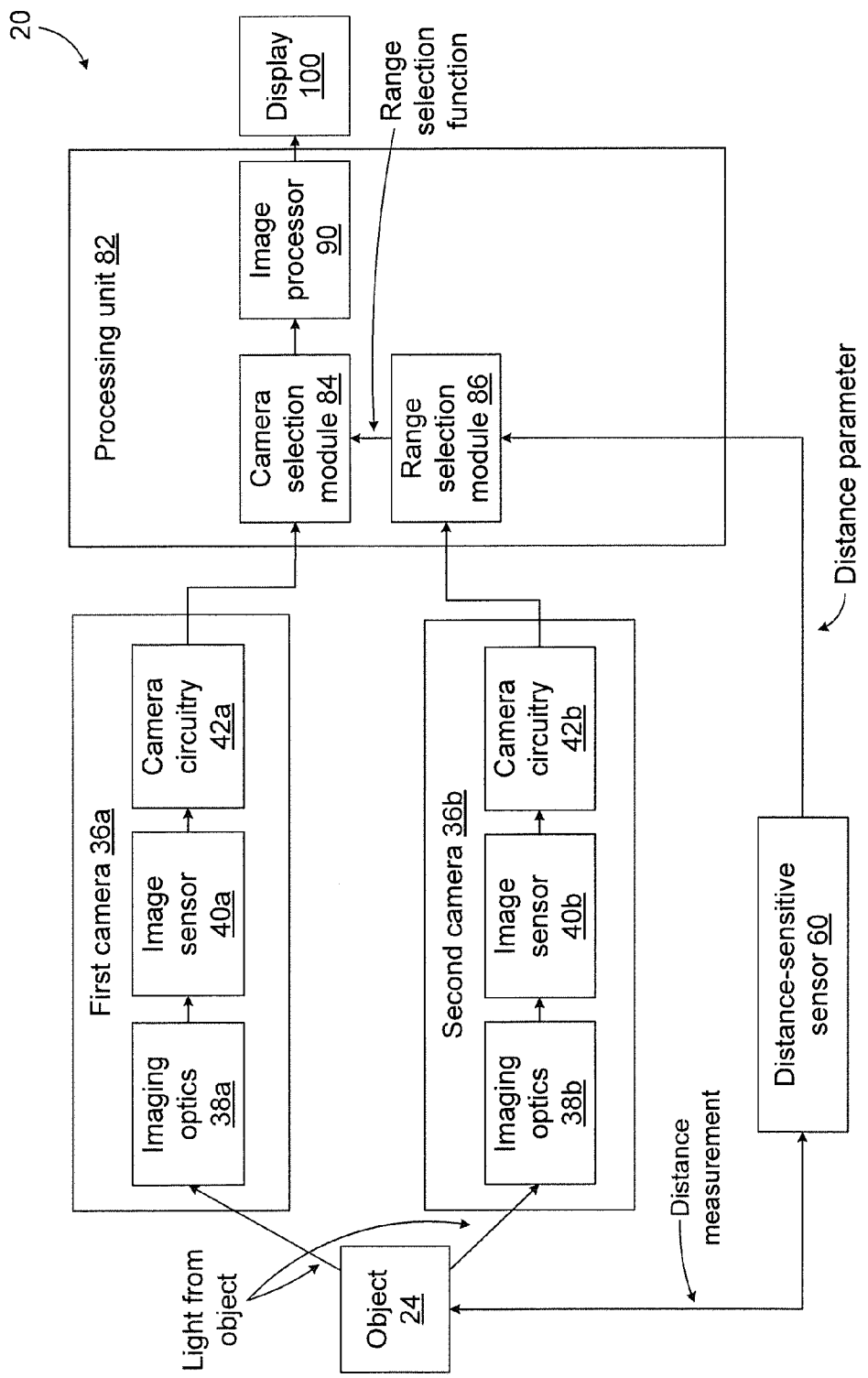

Referring now to FIGS. 8A and 8B, there are shown schematic block diagrams illustrating the components of the handheld magnification device 20 involved in the automatic selection and switching of the selected camera, in accordance with exemplary embodiments of the present invention. In FIG. 8A, the non-selected camera is inactive, while in FIG. 8B, the non-selected camera is active.

In both embodiments, the first and second cameras 36a and 36b of the handheld magnification device 20 are adapted to acquire images of the object 24. As described above, each camera may include imaging optics 38a and 38b, an image sensor 40a and 40b, and camera circuitry 42a and 42b. Concurrently with the image acquisition process, the distance-sensitive sensor 60 measures in real-time a distance parameter representative of the distance between the object 24 and the handheld magnification device 20. As also previously discussed, the distance parameter is outputted by the distance-sensitive sensor 60 and may be received by a range selection module 86 of the processing unit 82. The range selection module 86 may generate a binary-valued range selection function having a first output value when the object 24 is identified as being in the working range of the first camera 36a and a second output value when the object 24 is identified as being in the second working range 50b. This range selection function may be received by a camera selection module 84 of the processing unit 82, which is configured for automatically selecting, based on the output value of the range selection function, one of the first and second cameras 36a and 36b as the selected camera. The other one of one of the first and second cameras 36a and 36b therefore becomes the non-selected camera.

In FIG. 8A, only one of the first and second cameras 36a and 36b is active at any given time (i.e. the selected camera) while the other one remains inactive (i.e. the non-selected camera). The camera circuitry 42a and 42b of each of the first and second cameras 36a and 36b is connected to an image processor 90 of the processing unit 82 and outputs thereto images of the object 24 in a usable format.

The image processor 90 is adapted to receive the images and generate therefrom the magnified representation of the object 24 to be displayed by a display 100 of the handheld magnification device 20. Hence, while the camera circuitry 42a and 42b of both the first and second cameras 36a and 36b may be connected to the image processor 90, only the selected camera actually transmits image data to the image processor 90 at any given time. In order to be selected as the selected camera and be set into an active state where image data are transmitted to the image processor 90, each of the first and second cameras 36a and 36b may be connected to the camera selection module 84.

In FIG. 8B, however, both the first and second cameras 36a and 36b remain active at all times even though only the output of the selected camera is displayed as the magnified representation by the handheld magnification device 20. In the illustrated embodiment, the camera circuitry 42a and 42b of each of the first and second cameras 36a and 36b is connected to the camera selection module 84. Upon receiving the range selection function from the range selection module 86, the camera selection automatically selects one of the first and second cameras 36a and 36b as the selected camera and transmits the images acquired thereby to the image processor 90. As in FIG. 8A, the image processor 90 may then generate the magnified representation of the object 24 to be displayed by the display 100 from the images acquired by the selected camera.

It will be understood that FIGS. 8A and 8B are provided for illustrative purposes only and that, in other embodiments, the selection and switching of the selected camera may be performed differently and may involve additional components or modules. For example, in other embodiments, the processing unit may be provided two image processors for each of the first and second cameras. The outputs of the two image processors could both be received by the camera selection module 84, which would then select the output to be displayed by the handheld magnification device.

It will be readily understood that the processing unit 82 may include other modules and elements without departing from the scope of the present invention, such as a mode selection module for switching between a live magnification mode, wherein the magnified representation is displayed as a real-time video stream, and an image capture mode, wherein the magnified representation is displayed as a still view of the object; a text recognition module adapted to recognize and render in text form textual information on the object; a text-to-speech module for converting a text input rendered by the text recognition module to a speech output; and a memory element for storing the magnified representation of the object.

Referring back to FIG. 2, the handheld magnification device also includes a display 100 extending along the display face 30 of the casing 26 for displaying, in real-time, the magnified representation 22 of the object 24 based on the image acquired by the selected camera. It will be understood that embodiments of the present invention preferably allow the magnified representation 22 of the object 24 to be displayed to a user without appreciable time lag on the typical scale of human perception, thereby providing a seamless user experience over a broad and continuous range of distances. Further preferably, switching between the first and second cameras, or vice versa, is carried out in a manner that remains transparent to the user, that is, without inducing perceptible perturbations in the magnified representation 22 of the object 24 displayed by the display 100.

The display 100 preferably uses liquid crystal display (LCD), although any other appropriate display technology such as LED technology, organic LED (OLED) technology, plasma display panel (PDP) technology, light-emitting polymer display (LPD) technology or active-matrix OLED (AMOLED) technology may be used in other embodiments without departing from the scope of the invention.

As mentioned above, in some embodiments, the display 100 may, in addition to providing an output interface for displaying the magnified representation 22 of the object 24, include an input interface taking input from a user based on haptic and/or tactile contact. In such embodiments, the display 100 includes, on at least a portion thereof, a touch screen including a touch-sensitive surface. The display 100 may also include a backlight unit for providing backlight illumination toward the display 100. The backlight unit may be embodied, for example, by one or more LEDs or an electroluminescent panel (ELP), one or more CCFLs, or a hot cathode fluorescent lamps (HCFL) panel. However, other embodiments may not require a backlight unit, for example in embodiments wherein the display 100 is based on AMOLED technology.

The magnified representation 22 of the object 24 displayed by the display 100 may be a still image or a video stream. For example, the processing unit and the selected camera of the handheld magnification device 20 may together be adapted for generating the magnified representation 22 of the object 24 as a video stream having a frame rate of at least 30 frames per second.

The display 100 may have a diagonal measurement of between about 2 and 7 inches, and a resolution of at least 0.08 megapixels, corresponding to an array size of 320×240 pixels. For example, in one preferred embodiment, the display has a diagonal measurement of about 5 inches and a resolution of 0.384 megapixels, corresponding to an array size of 800×480 pixels. It will be understood by one of ordinary skill in the art that in order to enhance the see-through effect provided by the display 100 when displaying the magnified representation 22 of the object 24, the size of the display 100 relative to the size of the display face 30 of the casing 26 and the resolution of the display should preferably be maximized.

As also discussed above with reference to the embodiment of FIG. 4, the magnified representation 22 of the object 24 displayed by the display 100 may have been optically magnified by the imaging optics 38a and 38b of one of the first and second cameras 36a and 36b, and/or digitally magnified by one of the magnification module 44a or 44b of one of the first and second cameras 36a and 36b, and/or digitally magnified by the magnification module 98 of the processing unit 82.

Referring now FIGS. 2 and 4, the handheld magnification device 20 may also further include an ambient-light sensor 102 located on the casing 26 (e.g. on the display face 30 of the casing 26 in FIG. 2) and connected to the processing unit 82.

As used herein, the term "ambient-light sensor" refers to any photo detector designed to sense light or brightness in a manner similar to the human eye. The ambient-light sensor may be used whenever a system or device needs to know the ambient light conditions, as related to the human eye. Generally, an ambient-light sensor receives thereon visible light and converts it to an electrical current (i.e. photocurrent).

Likewise, the term "ambient light" is understood to encompass any light that does not originate from the handheld magnification device itself but from source outside the device, that is, background light. Ambient light may thus refer to any type of light, whether natural (e.g. sunlight) or artificial (e.g. incandescent lamp light, halogen lamp light). Ambient light as used herein is not limited to visible light and may include optical radiation over a wide range of wavelengths, including the spectral range of far infrared to ultraviolet.

The ambient light sensor 102 may include a light-sensitive element 104 having an optical spectral sensitivity designed to substantially match an optical spectral sensitivity of a human eye. The light-sensitive element 104 may be embodied by a photodiode, a photoresistor, a phototransistor or a photocell or by any other photoresponsive optical element providing an output depending on the intensity of the light received thereon. One of ordinary skill in the art will understand that the optical spectral sensitivity of a human may include the visible wavelength range, that is, from 400 nm to 700 nm with a peak close to 560 nm. However, it will also be understood that the operating range of the light-sensitive element 104 may, in principle, cover any appropriate part of the electromagnetic spectrum. Preferably, the light-sensitive element 104 is selected to be active in the range of 350 to 750 nm, and include one or more filters or shield for blocking infrared and ultraviolet radiation.

The light-sensitive element 104 is configured to receive thereonto ambient light from an environment 106 of the object 24 and to output luminance information on the environment 106 to the processing unit 82, the processing unit 82 automatically adjusting, based on the luminance information, a brightness of the display 100.

In the embodiment illustrated in FIG. 2, the ambient-light sensor 102 is advantageously located on the display face 30 of the casing 26 so as not to be disturbed by illuminating radiation projected from the camera face 28 by the lighting assembly 54 of the handheld magnification device 20 depicted, e.g., in FIGS. 1 and 3. Therefore, the environment 106 whose luminance information is outputted to processing unit 82 is preferably, but not necessarily, encompassed by the fields of view 46a and 46b of the first and second cameras 36a and 36b.

With reference to FIGS. 1, 3, 4, 9A and 9B, the handheld magnification device 20 may further include a pattern projection module 108. The pattern projection module 108 includes a laser source 110 for generating a laser beam. The laser source 110 may be embodied by any appropriate device of combination of devices able to generate a laser beam of visible light, that is, light that can be perceived by the human eye. Hence, the laser source 110 may be a gas laser, an electrically-pumped semiconductor lasers, an optically-pumped solid-state laser, an optical fiber laser, a laser diode and the like. It should be emphasized that the laser source 110 may be operated in both continuous wave and pulsed regimes. For example, in one embodiment, the laser source 110 may be a source emitting at a wavelength of about 650 nm, corresponding to a red laser beam.

The pattern projection module 108 also includes a diffractive optical element 112. As used herein, the term "diffractive optical element" refers to refers to an optical element configured to redirect chosen wavelengths of optical energy incident thereon along a predetermined set of directions. The diffractive optical element 112 may be a diffraction grating, a holographic element, a diffractive microstructure or any other appropriate diffractive element. The diffractive optical element 112 is provided in a path of the laser beam so that when the laser beam is incident thereupon, the diffractive optical element 112 generates an interference pattern that produces a structured pattern 114 in a reconstruction plane that may be visible when a suitable viewing surface, which may be the object 24 itself, as in FIGS. 9A and 9B, or any other appropriate background surface.

The pattern projection module 108 further includes a laser output 116 on the camera face 28 of the casing for projecting the structured visible pattern 114 toward the object 24, thereby circumscribing, at least partially, an acquisition zone 118 defining the image of the object 24 to be acquired by the selected camera (e.g. one of the first and second cameras 36a and 36b). Preferably, as illustrated in FIG. 3, the laser output 116 of the pattern projection module 108 may be disposed close to the first and second cameras 36a and 36b so that the optical axis of the structured visible pattern 114 remains close to the optical axes of the first and second cameras 36*a* and 36*b*.

In some embodiments, the structured visible pattern 114 may completely circumscribe the image of the object 24 to be acquired by the selected camera, that is, the structured visible pattern 114 defines a closed shape. This is the case illustrated in FIG. 9A, wherein the structured visible pattern 114 has a rectangular shape that defines a rectangular acquisition zone 118 on the object 24. For example, in one embodiment, the pattern projection module 108 may be able to generate a rectangular structured visible pattern 114 having a size of about 30 centimeters wide and 22.5 centimeters high at a distance of about 28 centimeters from the camera face 28 of the handheld magnification device 20.

Figure 9A:
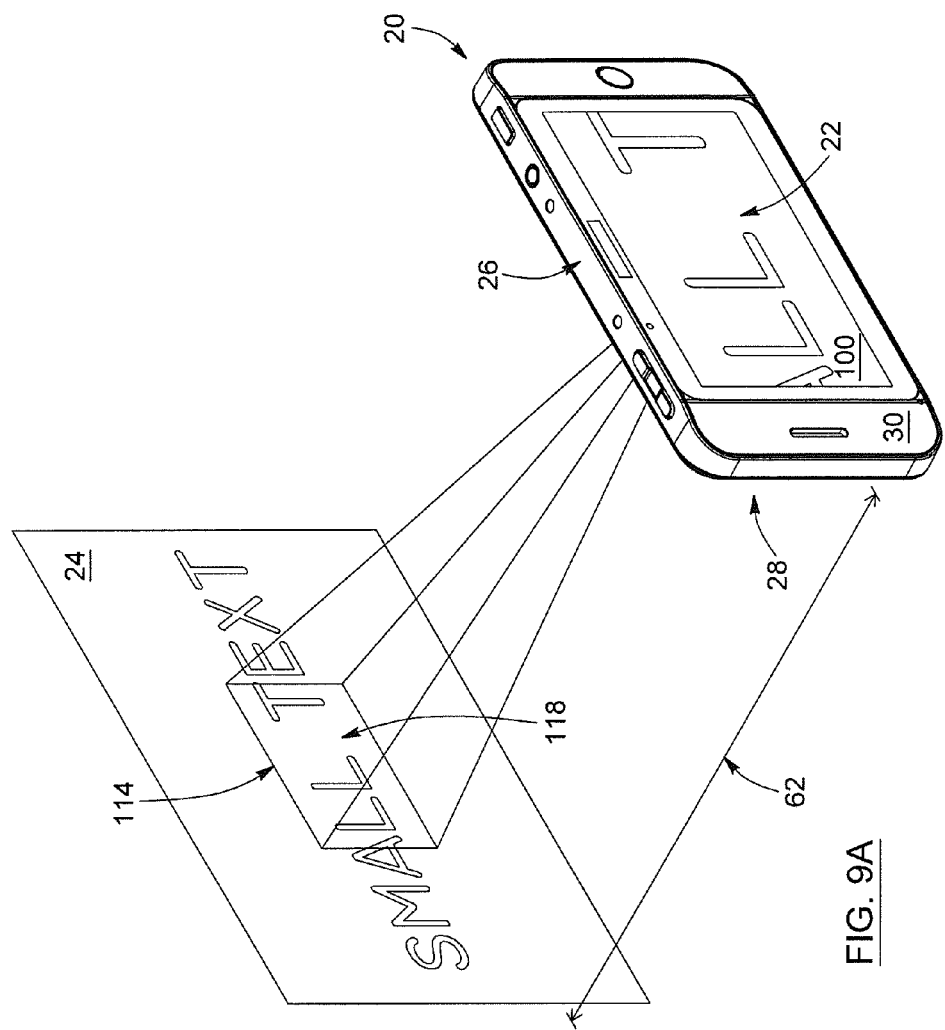
FIGS. 9A and 9B illustrate schematically the structured visible pattern projected by the pattern projection module of the handheld magnification device on the object whose image is to be acquired by the selected camera. The structured visible pattern circumscribes, at least partially, an acquisition zone defining the image of the object to be acquired by the selected camera.
Figure 9B:
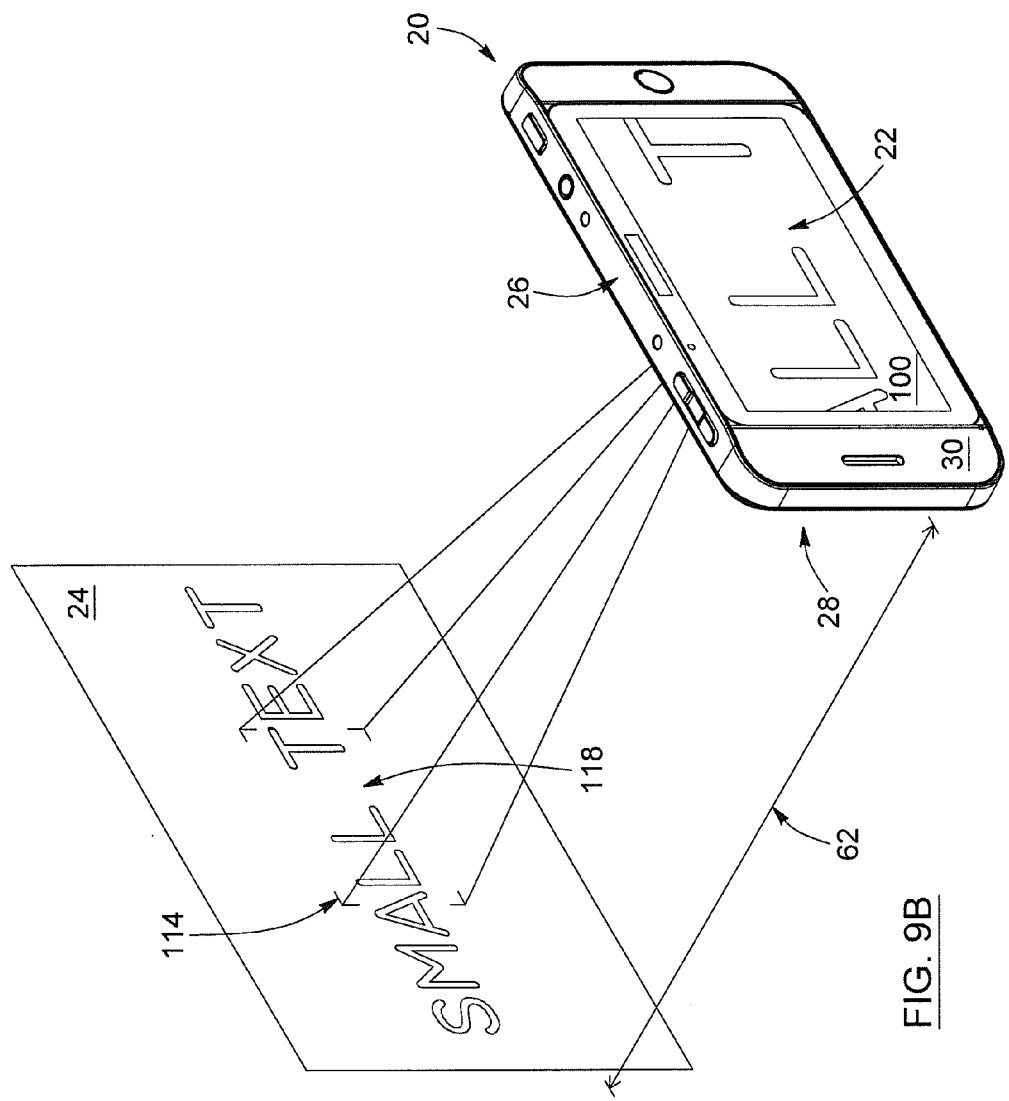

However, it will be understood that in other embodiments, the structured visible pattern 114 and corresponding acquisition zone 118 may assume a variety of dimensions and shapes other than rectangular (e.g. circular, semi-circular, square, elliptical, oval, or trapezoidal) without departing from the scope of the present invention. In yet other embodiments, the structured visible pattern 114 may only partially circumscribe the acquisition zone 188 defining the image of the object 24 to be acquired by the selected camera, as illustrated in FIG. 9B, wherein the structured visible pattern 114 indicates the corners of the image of the object 24 to be acquired by the selected camera.

Of course, numerous modifications could be made to the embodiments described above without departing from the scope of the present invention.

The invention claimed is:

1. A handheld magnification device for displaying a magnified representation of an object in a see-through manner, the handheld magnification device comprising:
    a casing having a camera face for pointing toward the object and a display face opposite to the camera face;
    a first and a second camera both adapted to acquire an image of the object, each camera having a corresponding field of view extending from the camera face of the casing, the first camera having a first working range proximate the handheld magnification device and the second camera having a second working range different from and extending beyond the first working range;
    a distance-sensitive sensor for measuring in real-time a distance parameter representative of a distance between the object and the handheld magnification device, the distance-sensitive sensor comprising a range selection module for outputting the distance parameter as a binary-valued function having a first output value when the object is identified as being in the first working range and a second output value when the object is identified as being in the second working range, the distance parameter being a hysteretic function of the distance between the object and the handheld magnification device, the hysteretic function comprising a first threshold value at which the distance parameter switches from the second to the first output value thereof as the distance between the object and the handheld magnification device decreases, and a second threshold value, separated from the first threshold value by a hysteresis width, at which the distance parameter switches from the first to the second output value thereof as the distance between the object and the handheld magnification device increases;
    a processing unit for receiving the distance parameter from the distance-sensitive sensor and for automatically selecting, based on the distance parameter and the first and second working ranges, one of the first and second cameras as a selected camera; and
    a display extending along the display face of the casing for displaying, in real-time, the magnified representation of the object based on the image acquired by the selected camera.

2. The handheld magnification device according to claim 1, wherein the first and second cameras have a resolution of at least 0.25 and 5 megapixels, respectively.

3. The handheld magnification device according to claim 1, wherein the first and second cameras are located in a central region of the camera face.

4. The handheld magnification device according to claim 1, wherein the first and second working ranges are contiguous without overlapping.

5. The handheld magnification device according to claim 4, wherein the first working range extends between about 2 and 10 centimeters from the camera face and wherein the second working range extends beyond about 10 centimeters from the camera face.

6. The handheld magnification device according to claim 1, wherein the first and second working ranges are overlapping.

7. The handheld magnification device according to claim 1, wherein the first and second working ranges are separated from each other by an inter-range distance.

8. The handheld magnification device according to claim 7, wherein the first working range extends between about 2 and 8 centimeters from the camera face and wherein the second working range extends beyond about 10 centimeters from the camera face.

9. The handheld magnification device according to claim 1, wherein the distance parameter is one of an output voltage and an output electrical current.

10. The handheld magnification device according to claim 1, wherein the processing unit comprises a selection module for automatically selecting, based on the distance parameter, the first and second cameras as the selected camera when the distance parameter has the first and second output values, respectively.

11. The handheld magnification device according to claim 1, wherein the distance-sensitive sensor comprises:
    an optical emitter for emitting light toward the object;
    an optical detector adjacent the optical emitter and configured for detecting light reflected from the object; and
    sensor circuitry connected to the optical detector and adapted to output the distance parameter based on the light reflected from the object and detected by the optical detector.

12. The handheld magnification device according to claim 11, wherein the optical emitter is an infrared emitter and the optical detector is an infrared detector.

13. The handheld magnification device according to claim 1, further comprising a lighting assembly projecting illuminating radiation from the camera face of the casing for illuminating the object.

14. The handheld magnification according to claim 13, wherein the lighting assembly comprises a first and a second lighting module associated with the first and second cameras, respectively, the first and a second lighting modules becoming active only upon selection by the processing unit of the first and second cameras as the selected camera, respectively.

15. The handheld magnification according to claim 14, wherein the first lighting module is distal from the first camera and wherein the second lighting module is used as a flash illumination source.

16. The handheld magnification device according to claim 1, wherein the processing unit and the selected camera are together adapted for generating the magnified representation of the object as a video stream having a frame rate of at least 30 frames per second.

17. The handheld magnification device according to claim 1, wherein the processing unit and the selected camera are together adapted for generating the magnified representation of the object as a still image.

18. The handheld magnification device according to claim 1, further comprising a pattern projection module comprising:
   a laser source for generating a laser beam;
   a diffractive optical element provided in a path of the laser beam and shaping the laser beam into a structured visible pattern;
   a laser output on the camera face of the casing for projecting the structured visible pattern toward the object, thereby circumscribing at least partially an acquisition zone defining the image of the object to be acquired by the selected camera.

19. The handheld magnification device according to claim 1, wherein the selected camera comprises at least one of imaging optics for generating the magnified representation of the object based on an optical magnification thereof and a magnification module for generating the magnified representation of the object based on a digital magnification thereof.

20. The handheld magnification device according to claim 1, wherein the processing unit comprises a magnification module for generating the magnified representation of the object based on a digital magnification thereof.

21. A handheld magnification device for displaying a magnified representation of an object in a see-through manner, the handheld magnification device comprising:
   a casing having a camera face for pointing toward the object and a display face opposite to the camera face;
   a first and a second camera both adapted to acquire an image of the object, each camera having a corresponding field of view extending from the camera face of the casing, the first camera having a first working range proximate the handheld magnification device and the second camera having a second working range different from and extending beyond the first working range;
   a distance-sensitive sensor for measuring in real-time a distance parameter representative of a distance between the object and the handheld magnification device;
   a processing unit for receiving the distance parameter from the distance-sensitive sensor and for automatically selecting, based on the distance parameter and the first and second working ranges, one of the first and second cameras as a selected camera, the processing unit comprising:
      a range selection module for receiving the distance parameter from the distance-sensitive sensor and for generating, based on the distance parameter, a binary-valued range selection function having a first output value when the object is identified as being in the first working range and a second output value when the object is identified as being in the second working range, the binary-valued range selection function being a hysteretic function of the distance between the object and the handheld magnification device, the hysteretic function comprising a first threshold value at which the range selection switches from the second to the first output value thereof as the distance between the object and the handheld magnification device decreases, and a second threshold value, separated from the first threshold value by a hysteresis width, at which the range selection function switches from the first to the second output value thereof as the distance between the object and the handheld magnification device increases; and
      a selection module for automatically selecting the first and second cameras as the selected camera when the range selection function has the first and second output values, respectively; and
   a display extending along the display face of the casing for displaying, in real-time, the magnified representation of the object based on the image acquired by the selected camera.

22. The handheld magnification device according to claim 21, wherein the first and second cameras have a resolution of at least 0.25 and 5 megapixels, respectively.

23. The handheld magnification device according to claim 21, wherein the first and second cameras are located in a central region of the camera face.

24. The handheld magnification device according to claim 21, wherein the first and second working ranges are contiguous without overlapping.

25. The handheld magnification device according to claim 24, wherein the first working range extends between about 2 and 10 centimeters from the camera face and wherein the second working range extends beyond about 10 centimeters from the camera face.

26. The handheld magnification device according to claim 21, wherein the first and second working ranges are overlapping.

27. The handheld magnification device according to claim 21, wherein the first and second working ranges are separated from each other by an inter-range distance.

28. The handheld magnification device according to claim 27, wherein the first working range extends between about 2 and 8 centimeters from the camera face and wherein the second working range extends beyond about 10 centimeters from the camera face.

29. The handheld magnification device according to claim 21, wherein the distance parameter is one of an output voltage and an output electrical current.

30. The handheld magnification device according to claim 21, wherein the distance-sensitive sensor comprises:
   an optical emitter for emitting light toward the object;
   an optical detector adjacent the optical emitter and configured for detecting light reflected from the object; and
   sensor circuitry connected to the optical detector and adapted to output the distance parameter based on the light reflected from the object and detected by the optical detector.

31. The handheld magnification device according to claim 30, wherein the optical emitter is an infrared emitter and the optical detector is an infrared detector.

32. The handheld magnification device according to claim 21, further comprising a lighting assembly projecting illuminating radiation from the camera face of the casing for illuminating the object.

33. The handheld magnification according to claim 32, wherein the lighting assembly comprises a first and a second lighting module associated with the first and second cameras, respectively, the first and a second lighting modules becoming active only upon selection by the processing unit of the first and second cameras as the selected camera, respectively.

34. The handheld magnification according to claim 33, wherein the first lighting module is distal from the first camera and wherein the second lighting module is used as a flash illumination source.

35. The handheld magnification device according to claim 21, wherein the processing unit and the selected camera are together adapted for generating the magnified representation of the object as a video stream having a frame rate of at least 30 frames per second.

36. The handheld magnification device according to claim 21, wherein the processing unit and the selected camera are together adapted for generating the magnified representation of the object as a still image.

37. The handheld magnification device according to claim 21, further comprising a pattern projection module comprising:
- a laser source for generating a laser beam;
- a diffractive optical element provided in a path of the laser beam and shaping the laser beam into a structured visible pattern;
- a laser output on the camera face of the casing for projecting the structured visible pattern toward the object, thereby circumscribing at least partially an acquisition zone defining the image of the object to be acquired by the selected camera.

38. The handheld magnification device according to claim 21, wherein the selected camera comprises at least one of imaging optics for generating the magnified representation of the object based on an optical magnification thereof and a magnification module for generating the magnified representation of the object based on a digital magnification thereof.

39. The handheld magnification device according to claim 21, wherein the processing unit comprises a magnification module for generating the magnified representation of the object based on a digital magnification thereof.

\* \* \* \* \*